United States Patent [19]
Abe et al.

[11] Patent Number: 5,309,286
[45] Date of Patent: * May 3, 1994

[54] ZOOM FINDER

[75] Inventors: Tetsuya Abe; Tahei Morisawa, both of Tokyo, Japan

[73] Assignee: Asahi Kogaku Kogyo Kabushiki Kaisha, Tokyo, Japan

[ * ] Notice: The portion of the term of this patent subsequent to Mar. 2, 2010 has been disclaimed.

[21] Appl. No.: 963,903

[22] Filed: Oct. 20, 1992

Related U.S. Application Data

[63] Continuation of Ser. No. 658,703, Feb. 21, 1991, Pat. No. 5,191,477.

Foreign Application Priority Data

Feb. 22, 1990 [JP] Japan ............... 2-41461

[51] Int. Cl.$^5$ ............... G02B 13/02
[52] U.S. Cl. ............... 359/695; 354/195.12
[58] Field of Search ............ 359/694, 695, 696, 689, 359/691; 354/222, 219, 195.12

[56] References Cited

U.S. PATENT DOCUMENTS

| | | |
|---|---|---|
| 3,821,768 | 6/1974 | Urano et al. . |
| 4,198,129 | 4/1980 | Vockenhuber . |
| 4,299,453 | 11/1981 | Momiyama et al. . |
| 4,636,040 | 1/1987 | Tokumaru . |
| 4,653,887 | 3/1987 | Wakamiya . |
| 4,725,130 | 2/1988 | Ozawa . |
| 4,757,336 | 7/1988 | Nakayama et al. . |
| 4,806,001 | 2/1989 | Okabe et al. . |
| 4,812,023 | 3/1989 | Kikuchi . |
| 4,828,372 | 5/1989 | Betensky et al. ............ 359/689 |
| 4,838,668 | 6/1989 | Betensky et al. . |
| 4,842,395 | 6/1989 | Sato et al. . |
| 4,854,680 | 8/1989 | Kikuchi . |
| 4,906,078 | 3/1990 | Inabata et al. . |
| 4,909,614 | 3/1990 | Itoh et al. . |
| 4,936,661 | 6/1990 | Betensky et al. ............ 359/676 |
| 4,941,012 | 7/1990 | Inabata . |
| 4,995,707 | 2/1991 | Hashimoto . |
| 5,054,897 | 10/1991 | Ozawa . |
| 5,071,235 | 12/1991 | Mori et al. . |
| 5,086,353 | 2/1992 | Mukai et al. ............ 359/676 |
| 5,160,954 | 11/1992 | Suzuki et al. . |
| 5,173,806 | 12/1992 | Ogata ............ 359/683 |
| 5,191,477 | 3/1993 | Abe et al. ............ 359/695 |
| 5,221,995 | 6/1993 | Yaneyama ............ 359/688 |
| 5,225,927 | 7/1993 | Nozaki et al. ............ 359/355 |
| 5,225,937 | 7/1993 | Horiuchi ............ 359/688 |
| 5,231,540 | 7/1993 | Shibata ............ 359/684 |

FOREIGN PATENT DOCUMENTS

| | | |
|---|---|---|
| 3827480 | 2/1989 | Fed. Rep. of Germany . |
| 3904640 | 8/1989 | Fed. Rep. of Germany . |
| 53-63014 | 6/1978 | Japan . |
| 57-139758 | 8/1982 | Japan . |
| 1209432 | 8/1989 | Japan . |

*Primary Examiner*—Paul M. Dzierzynski
*Assistant Examiner*—Drew A. Dunn
*Attorney, Agent, or Firm*—Sandler Greenblum & Bernstein

[57] ABSTRACT

A zoom finder is provided and includes a lens group for producing a field flattening effect for correcting a curvature of field. The zoom finder includes an objective optical system of a positive power having a first lens group of negative power, a second lens group of positive power, a third lens group of positive power, and an eyepiece optical system of positive power through which an image formed by the objective optical system is observed. The first lens group, the second lens group, the third lens group and the eyepiece optical systems are arranged in this order from an object side. The second lens group of the objective optical system is movable in an optical axis direction to vary the power, and the first and second lens groups are movable in association with each other in order to keep a constant diopter.

18 Claims, 26 Drawing Sheets

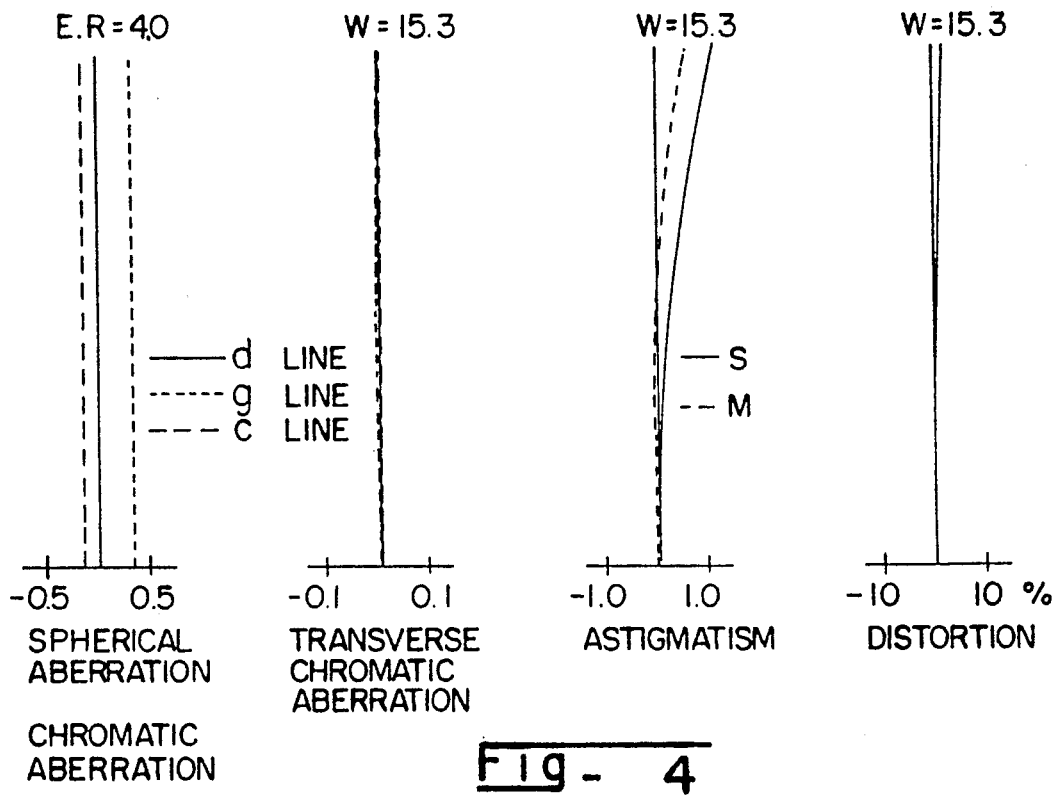
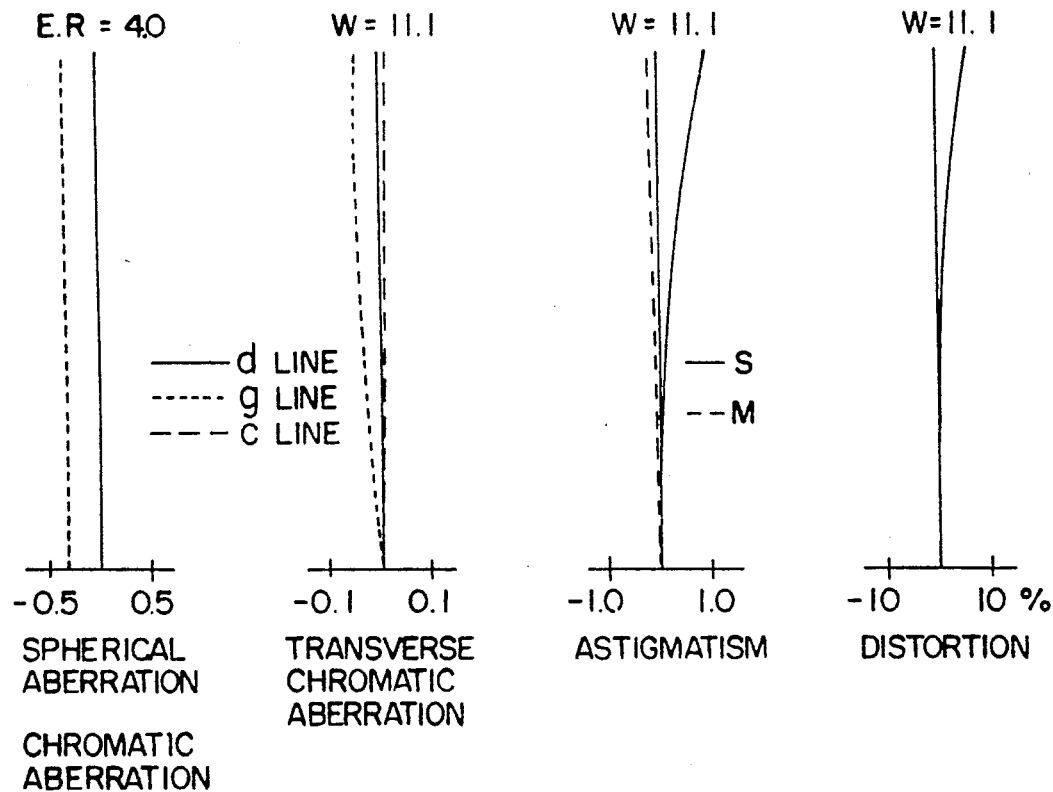

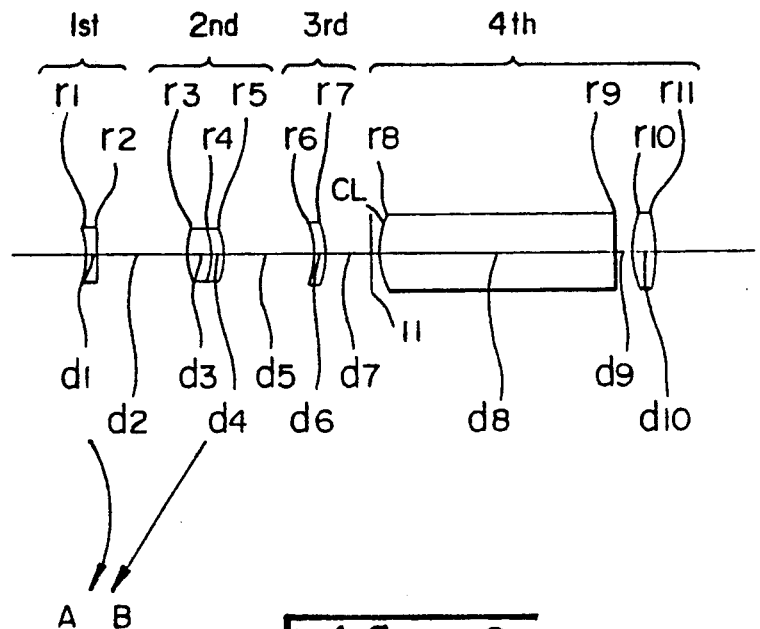
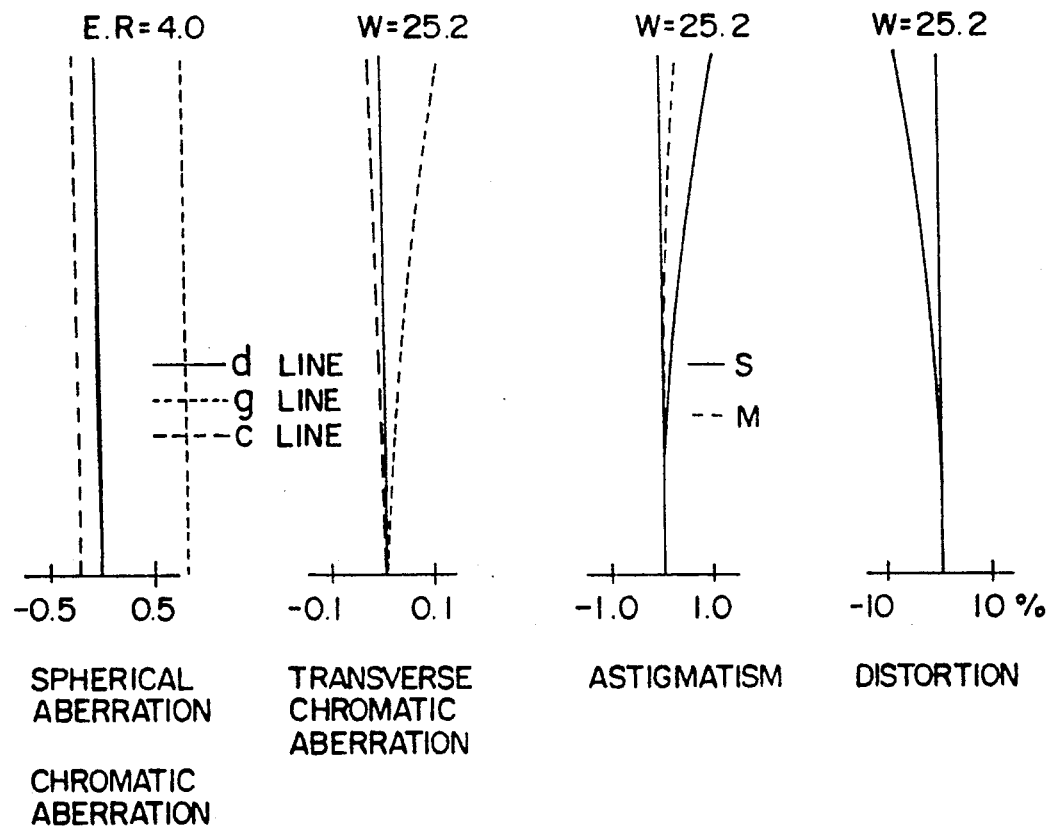

Fig-15
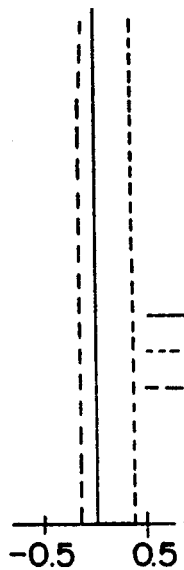
E.R =4.0
-0.5 0.5
SPHERICAL ABERRATION
CHROMATIC ABERRATION
— d LINE
---- g LINE
--- c LINE
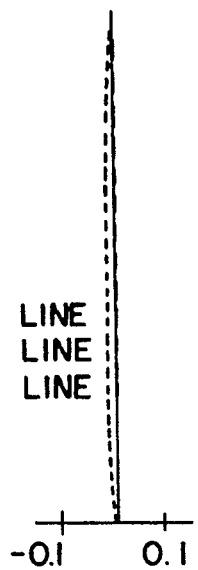
W=15.3
-0.1 0.1
TRANSVERSE CHROMATIC ABERRATION
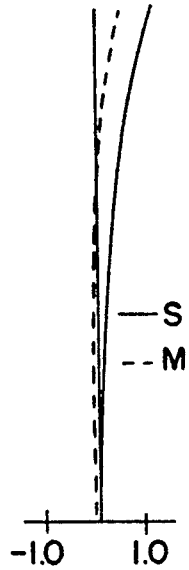
W=15.3
-1.0 1.0
ASTIGMATISM
— S
-- M
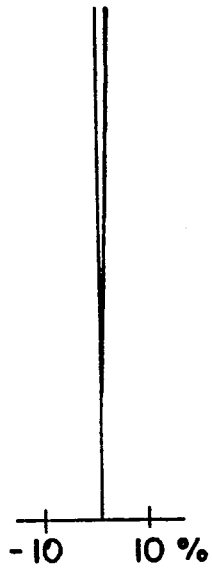
W=15.3
-10 10 %
DISTORTION
Fig-16
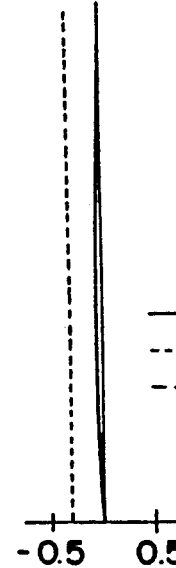
E.R=4.0
-0.5 0.5
SPHERICAL ABERRATION
CHROMATIC ABERRATION
— d LINE
---- g LINE
--- c LINE
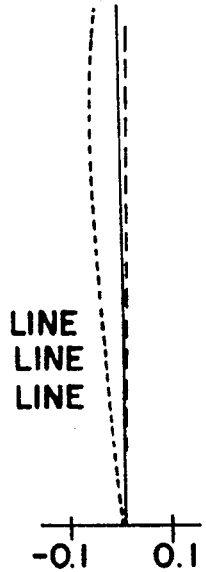
W=11.1
-0.1 0.1
TRANSVERSE CHROMATIC ABERRATION
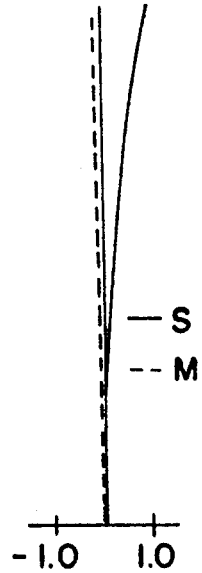
W=11.1
-1.0 1.0
ASTIGMATISM
— S
-- M
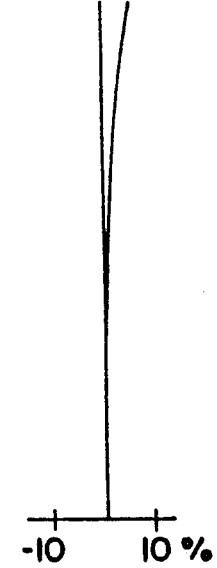
W=11.1
-10 10 %
DISTORTION

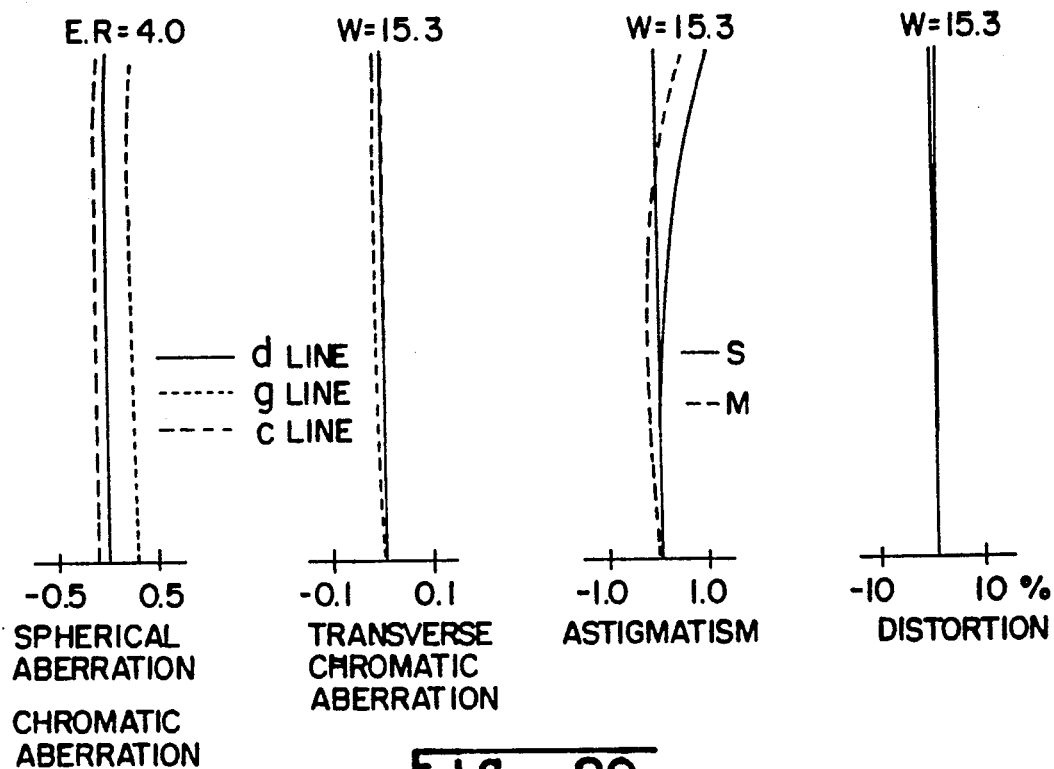
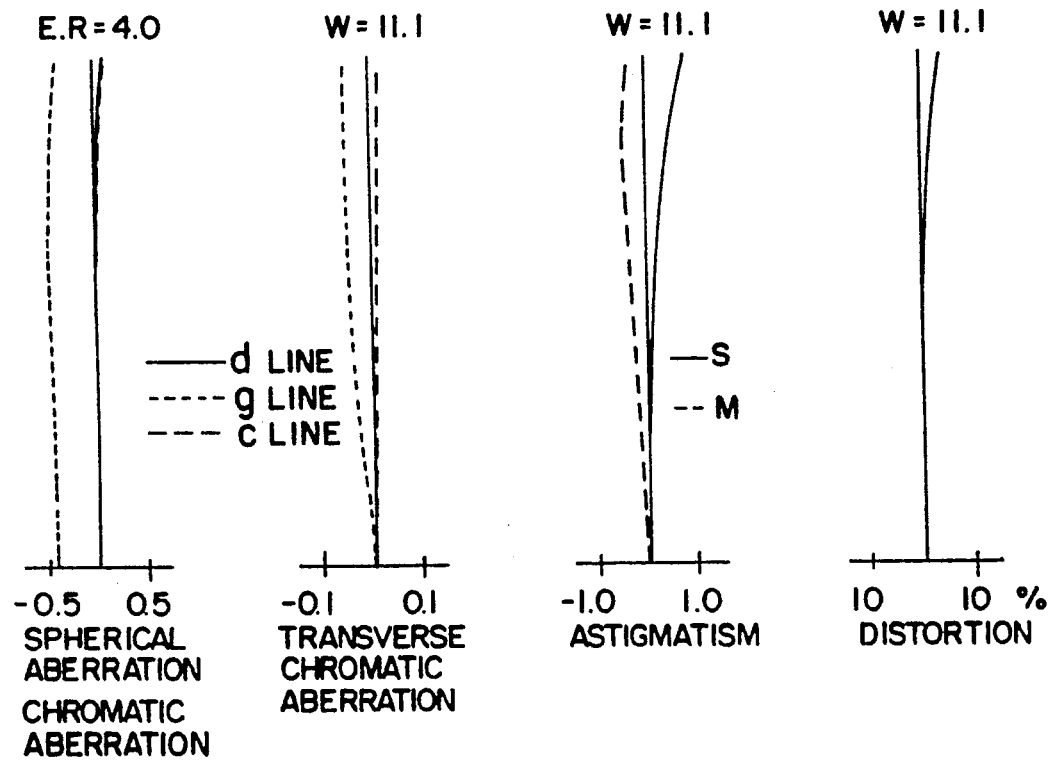

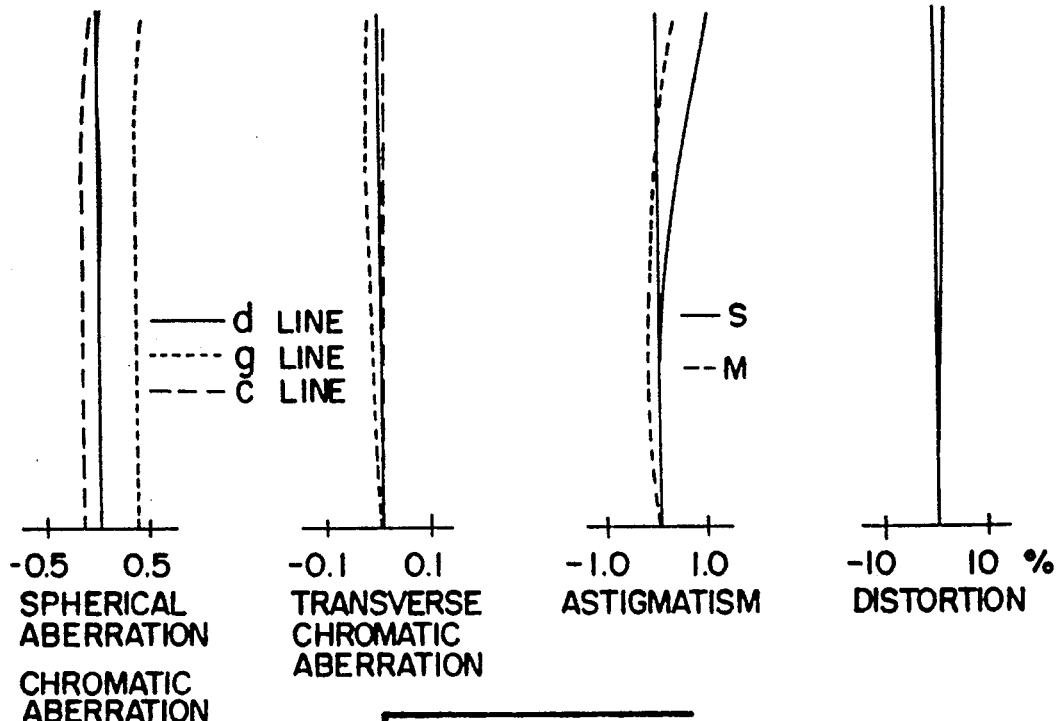
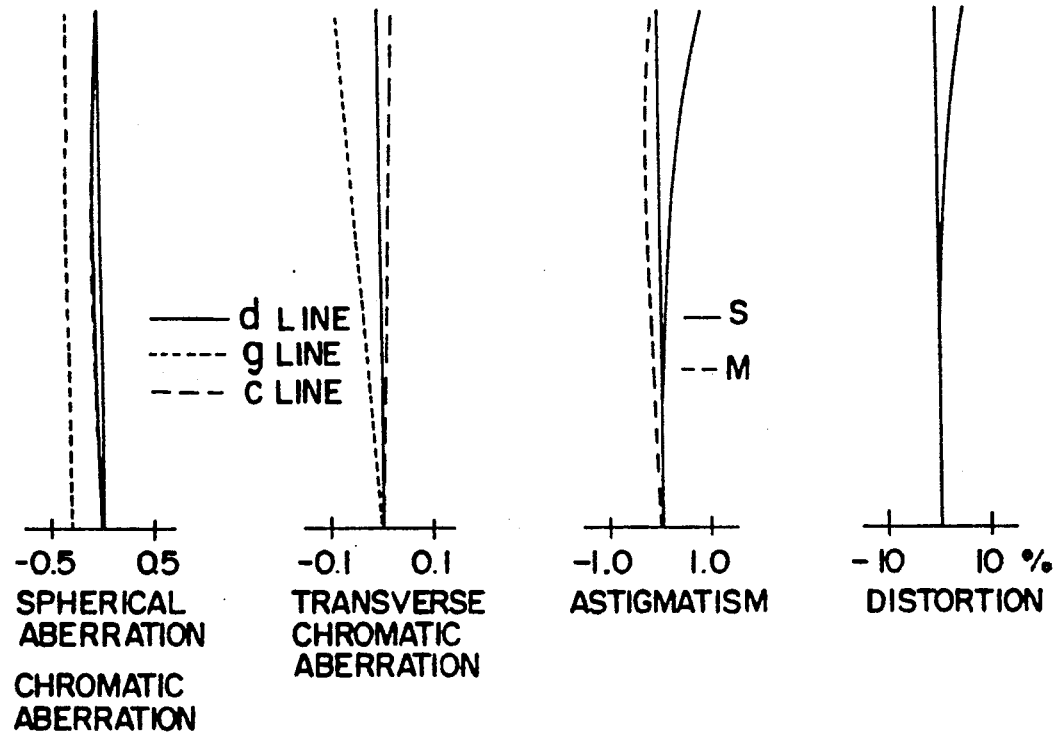

Fig-31
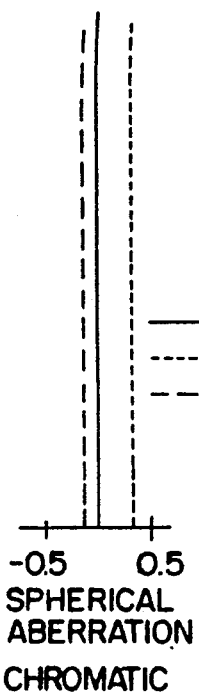
E.R=4.0
—— d LINE
······ g LINE
— — C LINE
-0.5  0.5
SPHERICAL
ABERRATION
CHROMATIC
ABERRATION
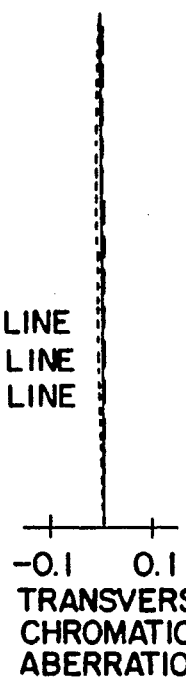
W=15.3
-0.1  0.1
TRANSVERSE
CHROMATIC
ABERRATION
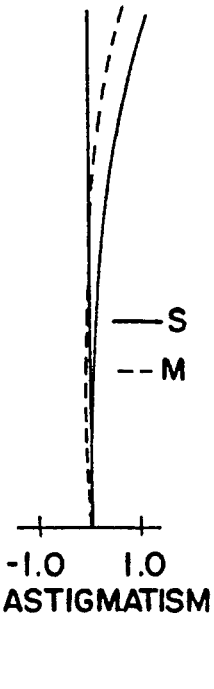
W=15.3
—— S
-- M
-1.0  1.0
ASTIGMATISM
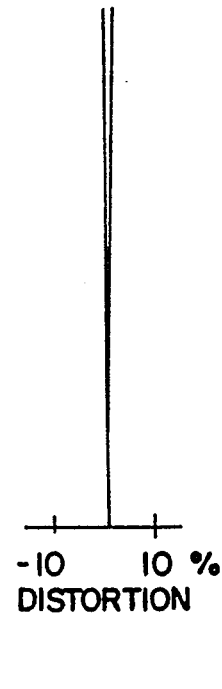
W=15.3
-10  10 %
DISTORTION
Fig-32
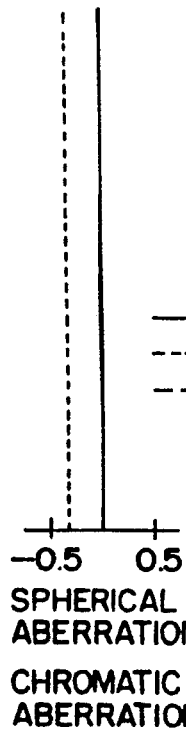
E.R=4.0
—— d LINE
······ g LINE
— — — C LINE
-0.5  0.5
SPHERICAL
ABERRATION
CHROMATIC
ABERRATION
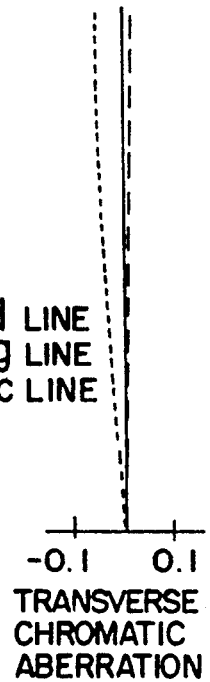
W=11.1
-0.1  0.1
TRANSVERSE
CHROMATIC
ABERRATION
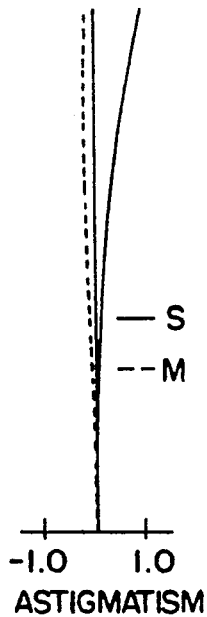
W=11.1
—— S
-- M
-1.0  1.0
ASTIGMATISM
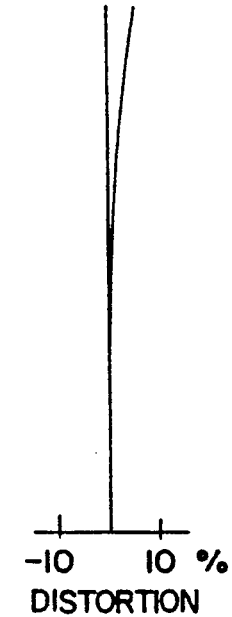
W=11.1
-10  10 %
DISTORTION

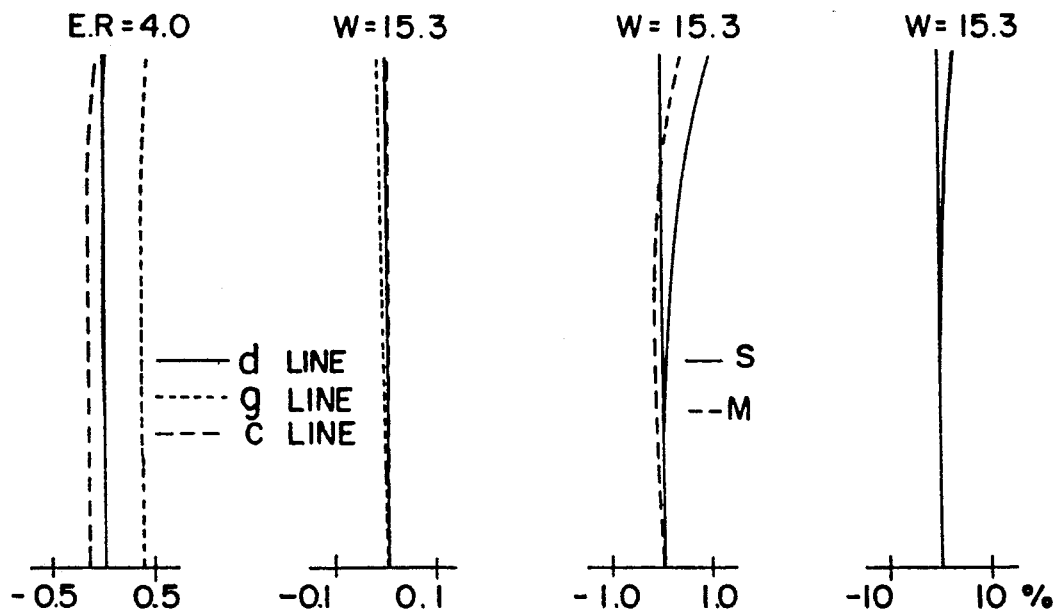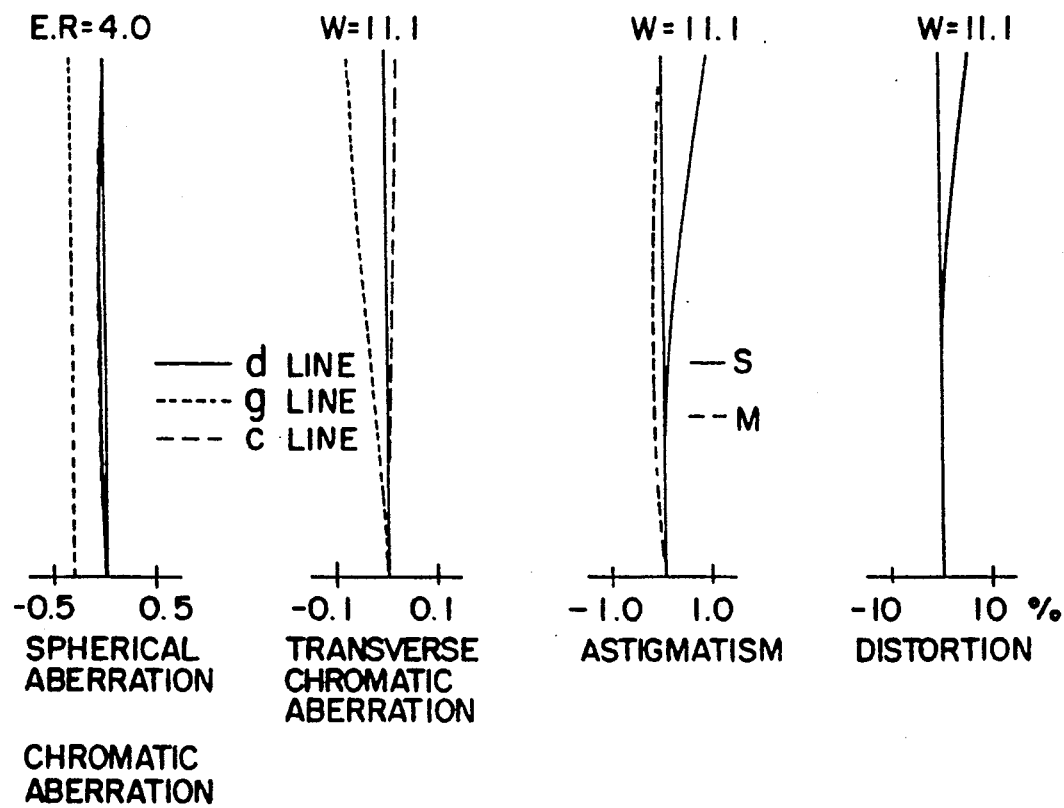

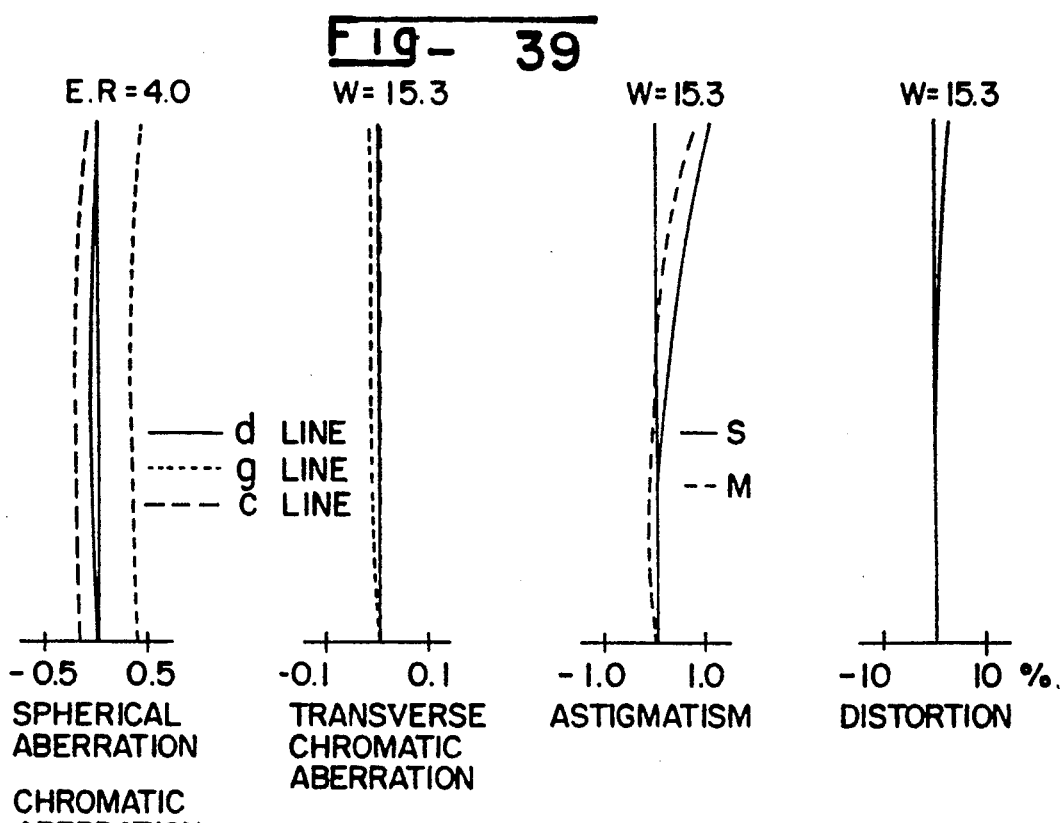
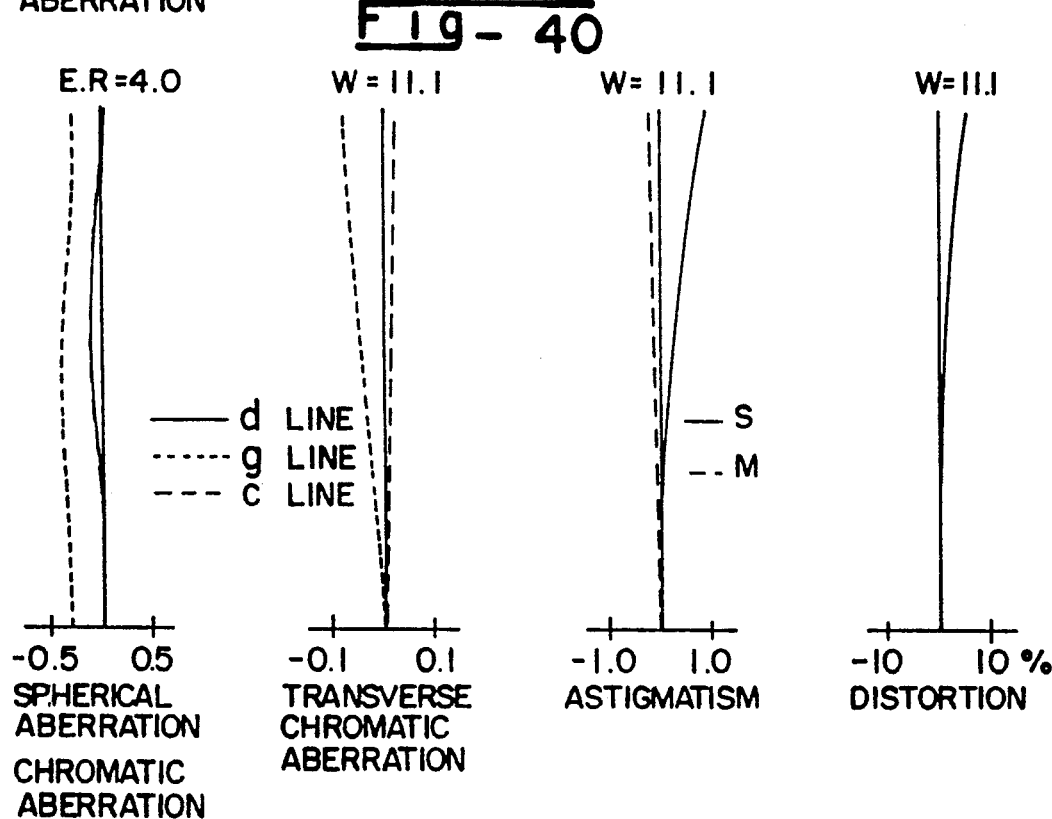

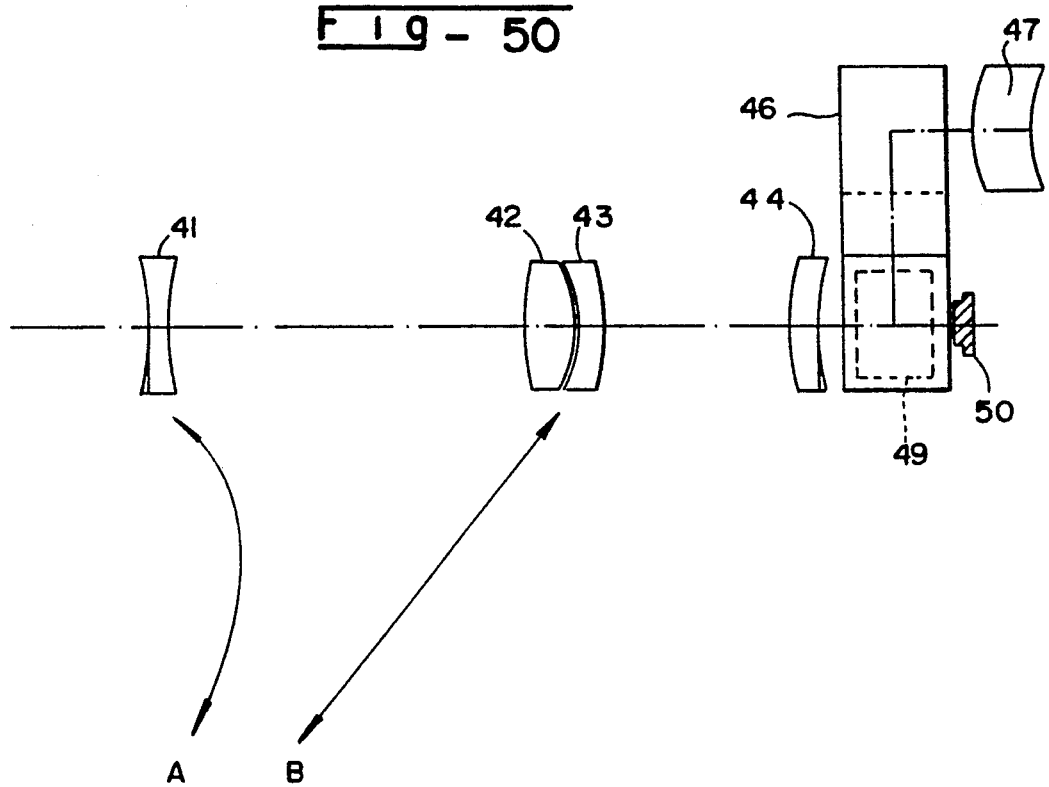
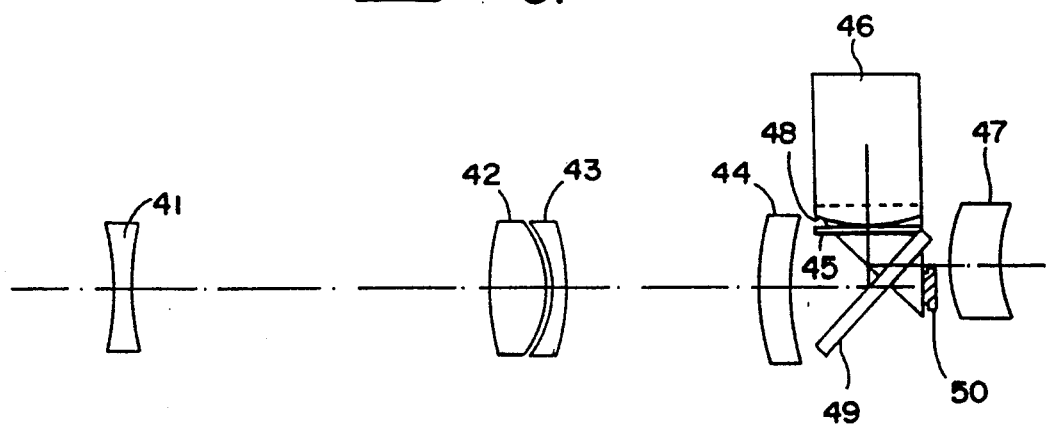

ZOOM FINDER

This application is a continuation of application Ser. No. 07/658,703, filed Feb. 21, 1991, now U.S. Pat. No. 5,191,477, issued Mar. 2, 1993.

BACKGROUND OF THE INVENTION

1. Field of the Invention

The present invention relates to a zoom finder made of an optical system separate from a photographing lens, and more particularly to a zoom finder in which the magnification is varied while keeping a constant diopter of the finder.

2. Description of Related Art

In a camera having a photographing optical system and a finder optical system separate therefrom, such as a lens shutter type camera or a video camera, if the photographing optical system is comprised of a zoom lens, it is preferable to incorporate a zoom finder in which the magnification of the finder is varied in accordance with the power (magnification) of the photographing optical system.

An inverted Galilean finder is usually used for the zoom finder, as disclosed for example in Japanese Unexamined Patent Publication No./52-63014. However, it is difficult to observe through an eye piece a virtual image formed by an objective lens in an inverted Gulidian finder. Furthermore, there were drawbacks, such as an increase of the diameter of a first lens group (objective lens group) and a dimmed field frame.

In addition to the foregoing, there is a tendency in a lens shutter type camera or a video camera that a photographing optical system thereof is made of a zoom lens of high power ratio and high efficiency. To respond to such a tendency, there is a long felt need for the development of a zoom lens in which a high variable power ratio can be easily realized and little Change of aberration due to the power variation takes place.

However, in a conventional real image type of zoom finder having a high variable power ratio, no aberration can be completely eliminated, and accordingly, a large fluctuation of the aberration by the zooming takes place, thus resulting in a dimmed finder image.

Furthermore, where the photographing optical system is comprised of a zoom lens, the photometering (brightness measuring) range for automatic exposure must be varied in accordance with a change in the photographing range. One solution thereto is to take a light flux of an object to be taken out from an image erecting prism, as disclosed in Japanese Unexamined Patent Publication No. 1-209432.

However, to take the light flux of the object out from the image erecting prism, it is necessary to provide an additional lens or lenses to adjust the photometric sensitivity distribution of measuring, such as a center-weighted measuring or an averaged light measuring.

SUMMARY OF THE INVENTION

The primary object of the present invention is to provide a simple zoom finder in which a large variable power ratio can be obtained a fluctuation of an aberration due to the power variation can be reduced, a high quality image can be formed, and a large magnification can be obtained.

Another object of the present invention is to provide a zoom finder in which the photometering (brightness measuring) range with respect to the photographing range can be kept constant.

According to the present invention, a zoom finder is provided including a positive optical Objective system having a negative first lens group, a positive second lens group, and a third lens group (being either positive or negative). A positive condensor lens is located near the image formed by the objective optical system and a positive eye piece optical system is provided through which an image formed by the objective optical system can be observed. The zoom finder also includes for conducting power variation of the objective optical system by moving the second lens group and diopter adjusting means for moving the first lens group in association with the second lens group to keep diopter constant.

With this arrangement, since no of diopter occurs regardless of zooming, and since the fluctuation of aberration due to zooming is small, a clear finder field of view can be realized in a zoom finder of a high power ratio.

When the first lens group is made of a negative lens, an excess negative distortion occurs due to a large dispersion of the circumferential light flux of the first lens group, especially at a wide-angle extremitY.

To prevent this, in a preferred embodiment of the present invention, the first lens group is provided, on at least one surface thereof, with an aspherical surface having a curvature which decreases toward the peripheral portion thereof.

The asphericity contributes to a restriction of the dispersion of the circumferential light flux of the first lens group, thus resulting in reduced distortion.

Preferably, the eighth aspherical coefficient $A_{18}$ satisfies the following formula e,crc/1/ :

$$0 < K.A_{18} < 0.000001 \qquad (1)$$

wherein when the aspherical surface is the first surface, $k=1$ and when the aspherical surface is the last surface, $K=-1$.

When the eighth aspherical coefficient $A_{18}$ satisfies the relationship defined by the formula (1), the dispersion of the circumferential light flux of the first lens group is reduced to effectively restrict the distortion.

If the eighth aspherical coefficient $A_{18}$ is below the lower limit (zero), there is an outstanding negative distortion due to enhanced dispersion. Conversely, if the eighth aspherical coefficient $A_{18}$ is above the upper limit (0.000001), the dispersion is too weak to restrict excess positive distortion.

The amount x of asphericity (SAG amount) of a lens is given by the following equation:

$$x = C_i \cdot h^2 / [1 + \{1 - (1k_1) \cdot h^2 \cdot C_i^2\}^{\frac{1}{2}}] + A_{14} \cdot h^4 + A_{16} \cdot h^6 + A_{18} \cdot h^8 + A_{110} \cdot h^{10} + \ldots$$

wherein $C_i$ designates a curvature near paraxial of an aspherical surface of No. i-th lens group, $k_i$ designates the cone constant of a radius of a curvature of an aspherical surface No. i-th lens group, h designates the height on a lens surface from an optical axis, $A_{14}$ designates the fourth aspherical coefficient of No. i-th lens group, and $A_{18}$ designates the eighth aspherical coefficient of No. i-th lens group.

If the displacement of the second lens group is constant, the greater the power ratio of the zoom lens is, the larger the power of the second lens group is, and accordingly, the light flux passing the peripheral portion of the second lens group is largely converged, resulting in the occurrence of a positive spherical aberration and a coma or the like.

To avoid the occurrence of the aberration, according to another embodiment of the present invention, the second lens group is made of a negative meniscus lens having a convex-convex lens, wherein at least one of the first surface and the last surface of the second lens group is provided with an aspherical surface having a curvature which decreases toward the peripheral portion thereof.

With this construction, the dispersion of the circumferential light flux is weakened by the aspherical surface, so that the spherical aberration and the coma can be eliminated.

In this case, the fourth aspherical coefficient $A_{24}$ preferably satisfies the following formula (2):

$$-0.001 < K \cdot A_{34} < -0.00001 \quad (2)$$

wherein $K = 1$ when the first surface is the aspherical surface, and $K = -1$ when the last surface is the aspherical surface.

When the fourth aspherical coefficient $A_{24}$ satisfies the relationship of (2) mentioned above, the convergence of the circumferential light flux is effectively weakened, resulting in no or little spherical aberration and coma.

If the fourth aspherical coefficient $A_{24}$ is below the lower limit ($-0.001$), the convergence of the circumferential light flux is too weak to restrict excess negative aspherical aberration and coma. Conversely, if the fourth aspherical coefficient $A_{24}$ is above the upper limit ($-0.00001$), no dispersion of the circumferential light flux can be restricted, so that the positive spherical aberration and coma excessively occur.

The greater the power ratio is, the greater the positive power of the second, lens group is, and accordingly, the Petzval's sum increases in the positive direction especially at a telephoto extremity. This results in an increased curvature of the field in the vicinity of the field of view.

To solve this problem, the third lens group is preferably comprised of a meniscus lens of a small power.

By the use of meniscus lens of a small power, the Petzval's sum can be decreased without the occurrence of the spherical aberration and coma, etc., due to the field flattening effect of the third lens group, so that the curvature of the field can be corrected.

In this case, preferably, the focal length f3 of the third lens group and the focal length $f_t$ of the objective optical system at a telephoto extremity satisfy the following relationship (3):

$$|f_t|/3/<0.5 \quad (3)$$

When the condition given by the formula (3) is satisfied, the curvature of the field can be effectively restricted without having the spherical aberration and the coma aberration.

If the value of ($f_t$/f3) is above the upper limit (0.5), the power of the third lens group is too strong to eliminate the spherical aberration and coma, etc.

According to another embodiment of the present invention, the third lens group is moved in the optical axis direction in association with the first lens group and the second lens group.

With this embodiment, a change of the curvature of the field caused by the zooming can be corrected.

According to another aspect of the present invention, there is provided a zoom finder having an objective optical system and an eye piece optical system, wherein the provision is made to an optical path dividing element, which is located in the optical path closer to an object to be taken than the focal point of the objective optical system, to split the optical path into two optical paths, one of which has therein a photometric ring element in the vicinity of the focal point of the objective optical system.

With this arrangement, since the photometering element (brightness measuring element) is placed in the vicinity of an image forming position in which an image of the object is formed, the object image can be formed on the photometering element without using a special photometering lens. Furthermore, a constant position in the finder field of view can be precisely measured, so that there is no displacement of the photometering range in the finder field of view, regardless of a change of the field of view due to the zooming. In addition to the foregoing, the photometering sensitivity distribution can be easily varied by adjusting the position of the photometering element.

Preferably, the optical path dividing element is embodied by a half mirror which has at its rear surface a dispersion surface.

With this embodiment, the photometering sensitivity distribution can be optionally adjusted by adjusting the dispersion characteristics of the back surface of the half mirror without changing the position of the photometering element.

The present disclosure relates to subject matter contained in Japanese patent application No. 02-41461 (filed on Feb. 22, 1990) which is expressly incorporated herein by reference in its entirety.

BRIEF DESCRIPTION OF THE DRAWINGS

The invention will be described below in detail with reference to the accompanying drawings, in which:

FIGS. 1, 5, 9, 13, 17, 21, 25, 29, 33, and 37 are views showing an arrangement of lenses, according to the first through tenth embodiments of the present invention, respectively;

FIGS. 2, 6, 10, 14, 18, 22, 26, 30, 34, and 38 are diagrams of various kinds of aberrations at a wide-angle extremity in the first through tenth embodiments of the present invention, respectively;

FIGS. 3, 7, 11, 15, 20, 23, 27, 31, 35, and 39 are diagrams of various kinds of aberrations at an intermediate angle of view, in the first through tenth embodiments of the present invention, respectively;

FIGS. 4, 8, 12, 16, 20, 24, 28, 32, 36, and 40 are diagrams of various kinds of aberrations at a telephoto extremity, in the first through tenth embodiments of the present invention, respectively;

FIG. 50 is a schematic plan view of an optical system according to another aspect of the present invention;

FIG. 51 is a side elevational view of an optical system shown in FIG. 50; and,

DESCRIPTION OF THE PREFERRED EMBODIMENTS

Figure 1:
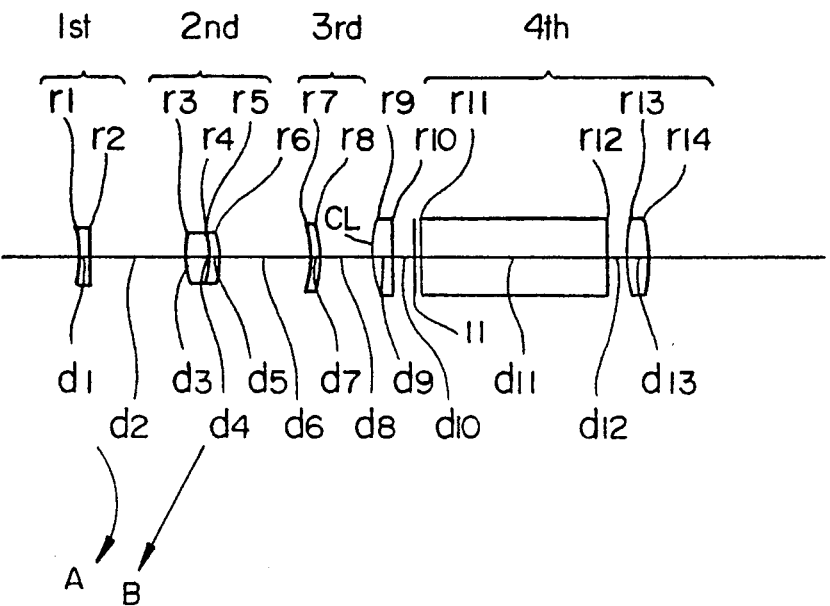
Figure 2:
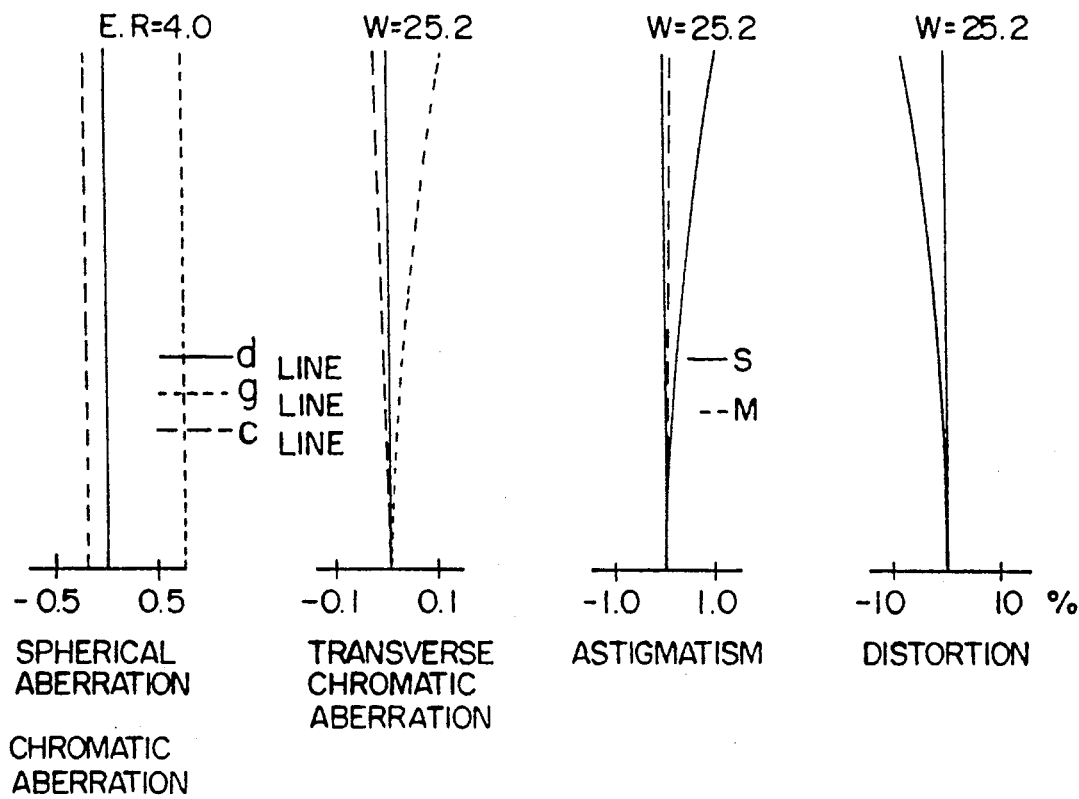
Figure 7:
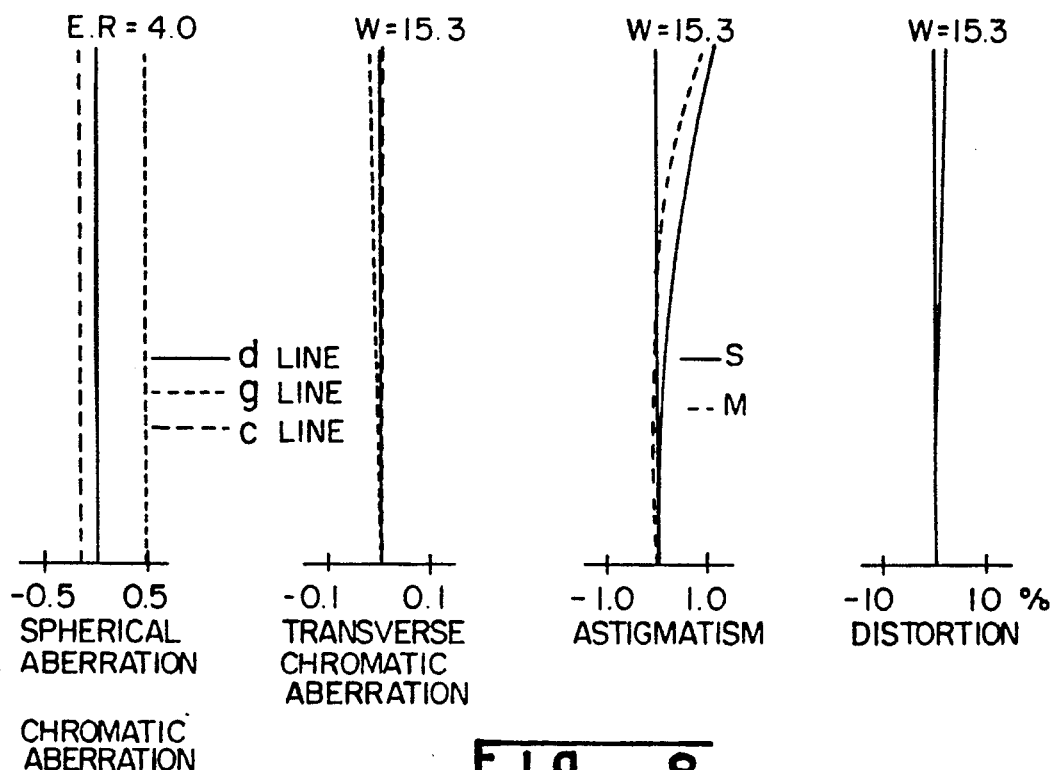
Figure 8:
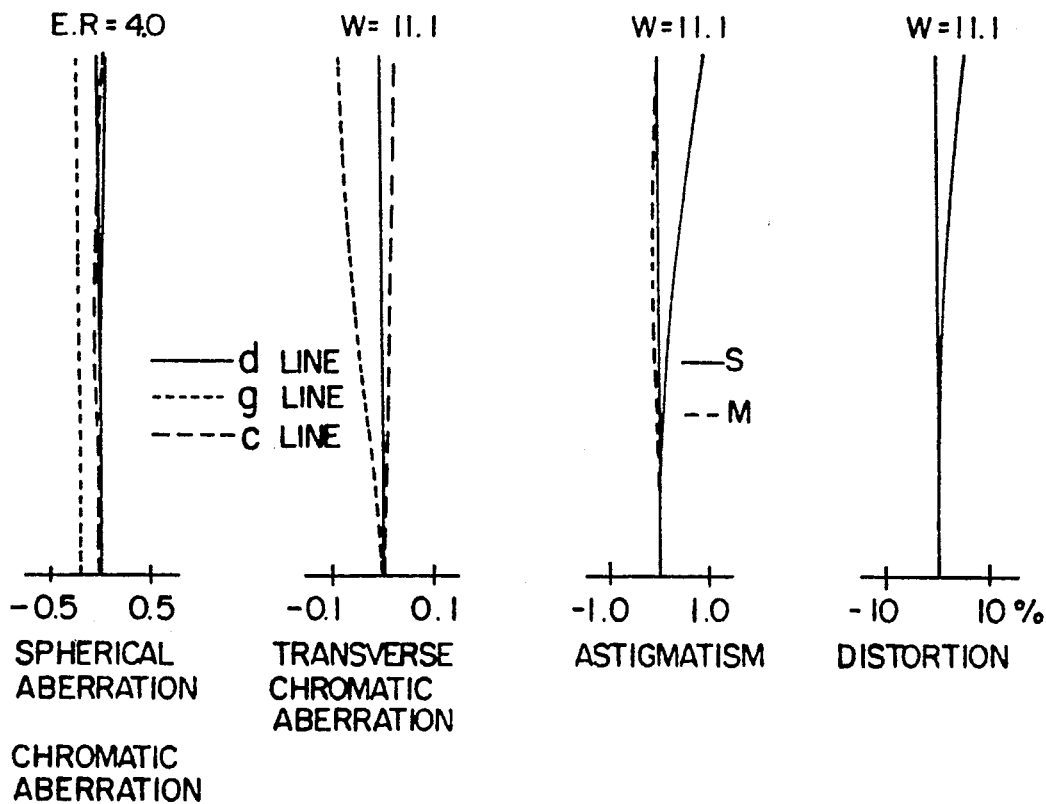
Figure 9:
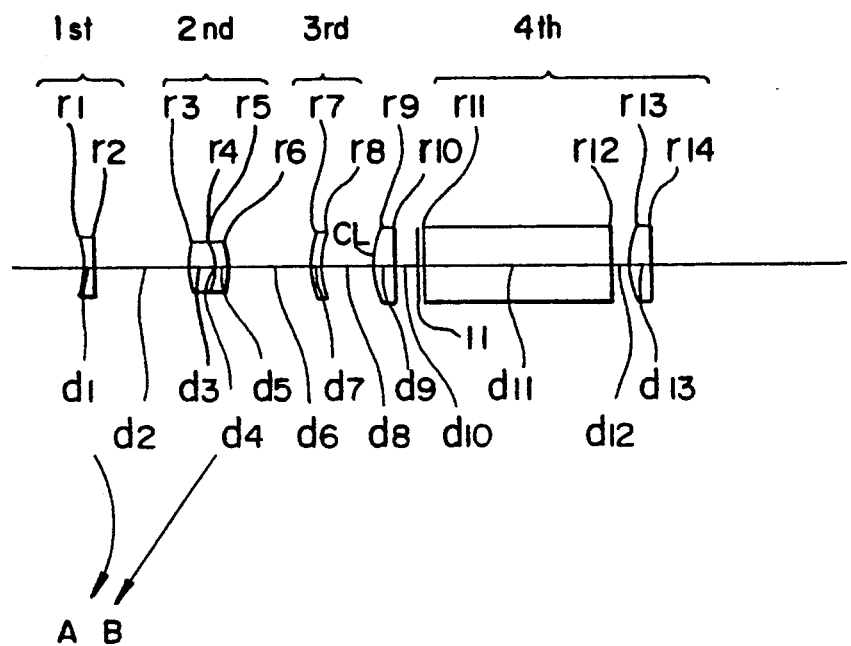
Figure 10:
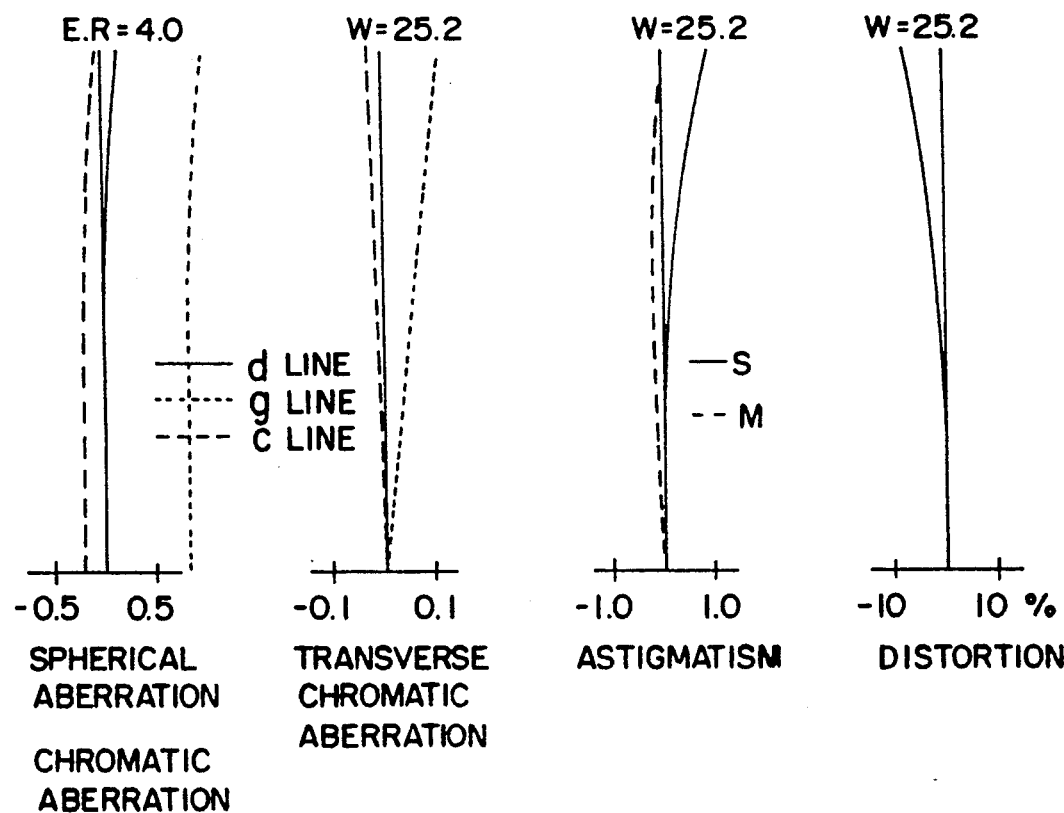
Figure 11:
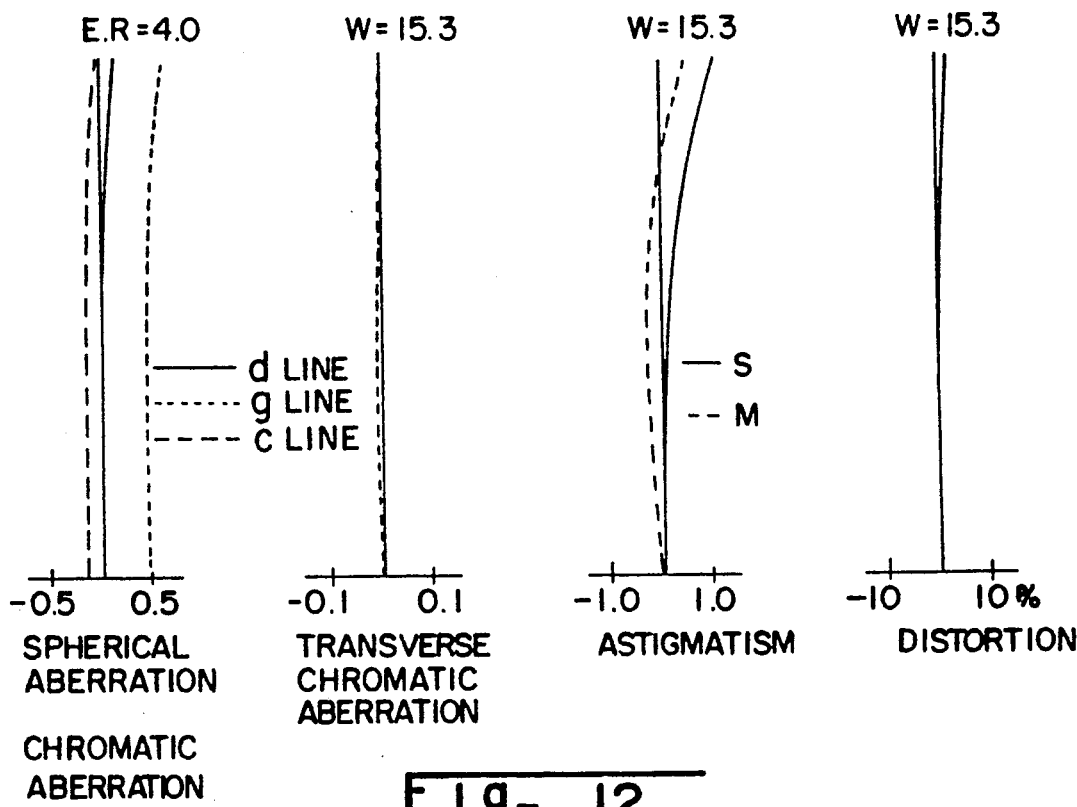
Figure 12:
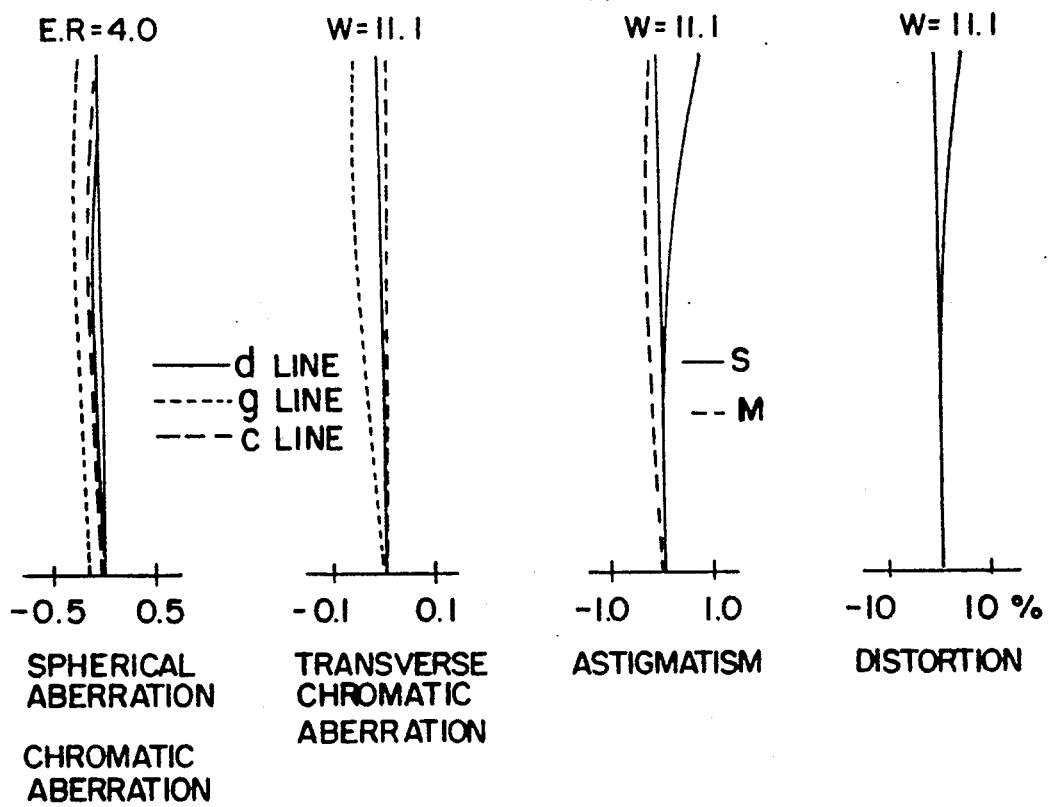
Figure 13:
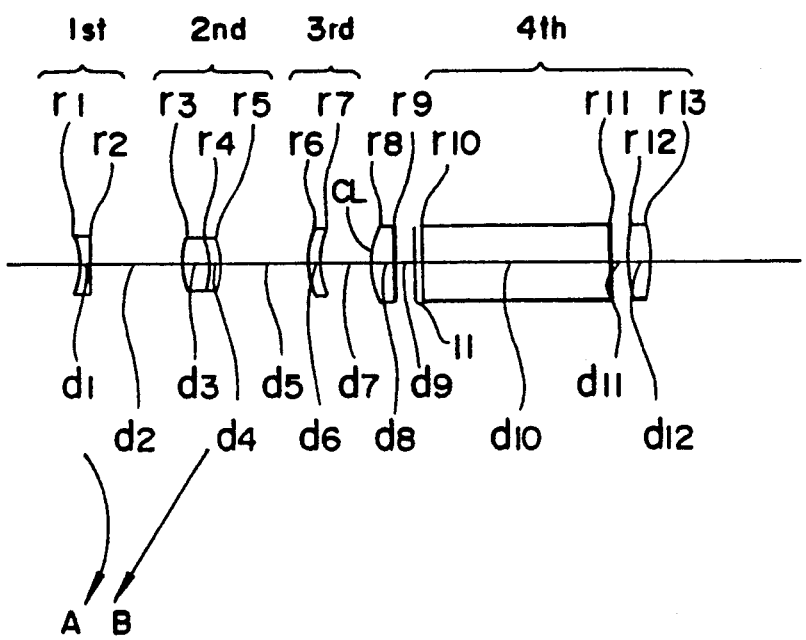
Figure 14:
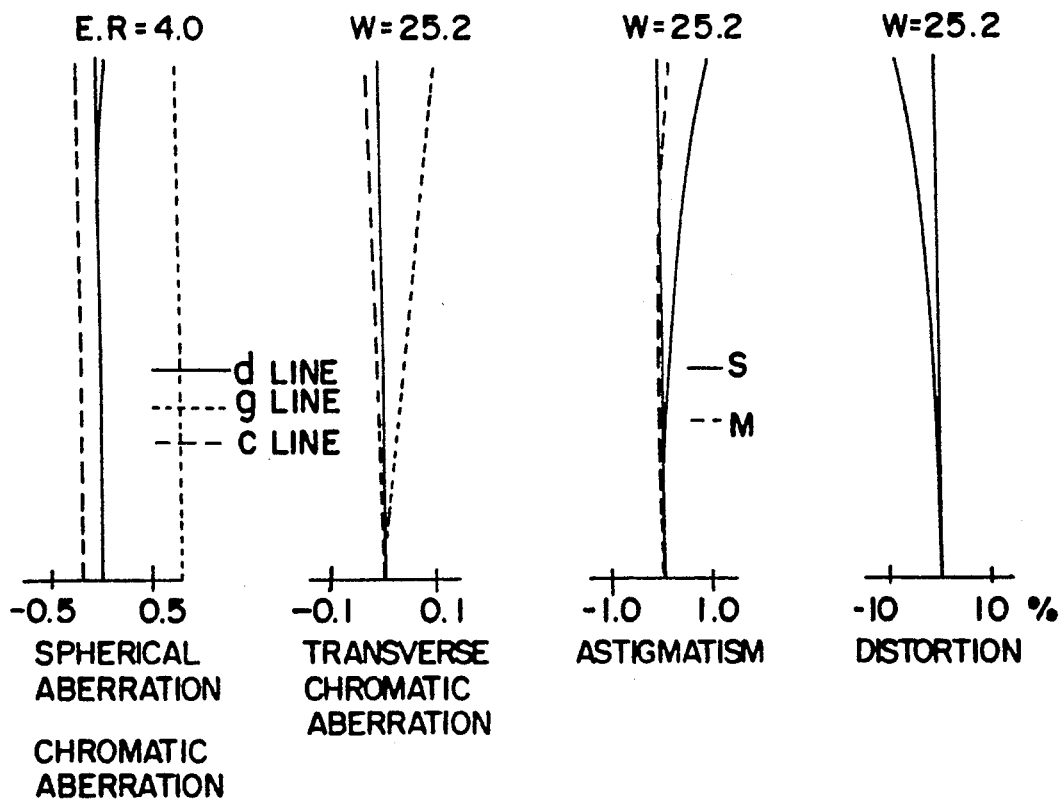
Figure 17:
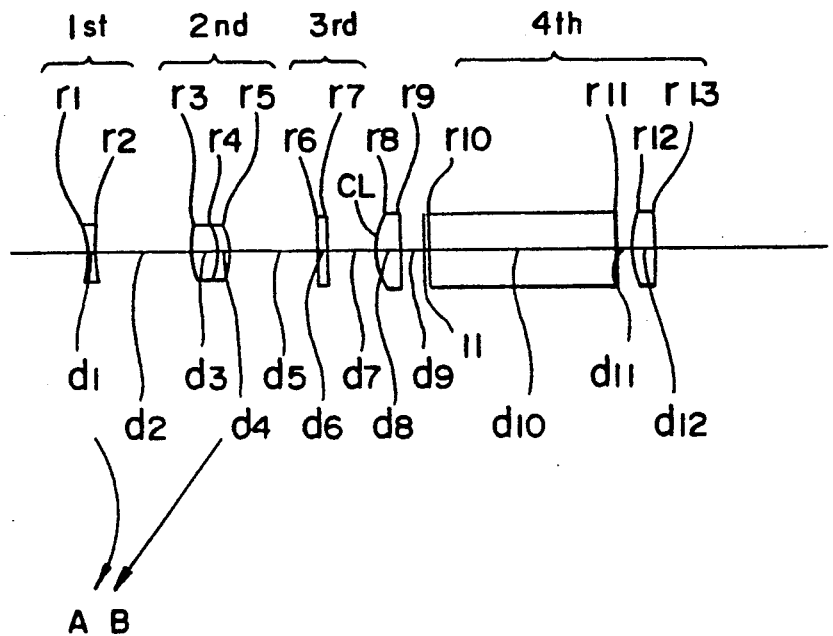
Figure 18:
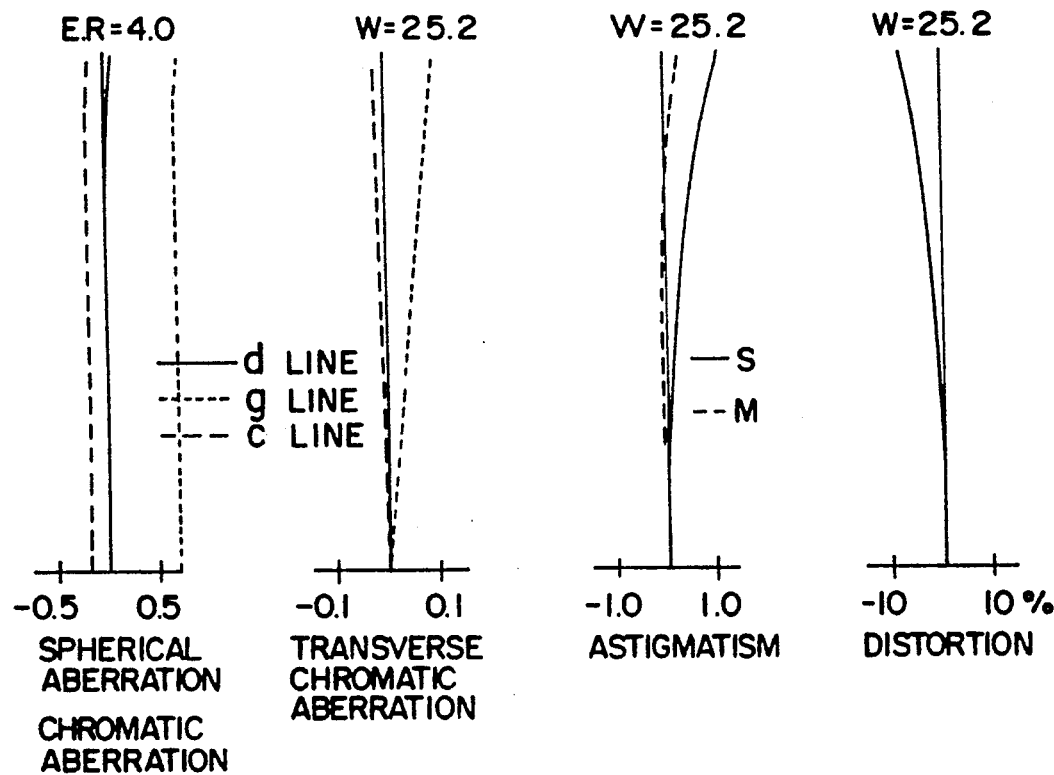
Figure 21:
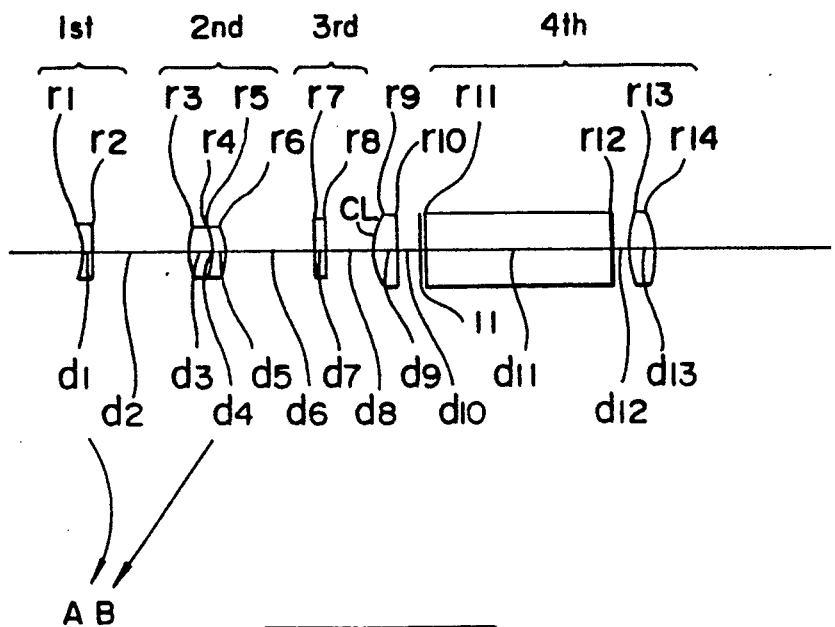
Figure 22:
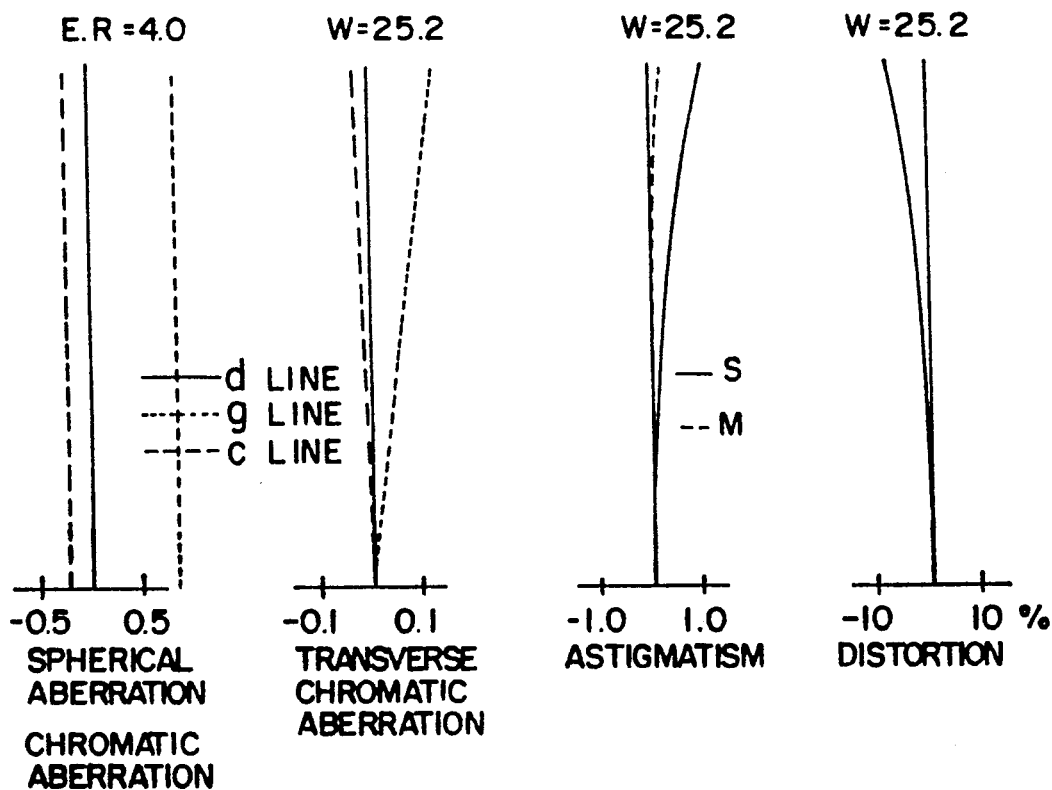
Figure 23:
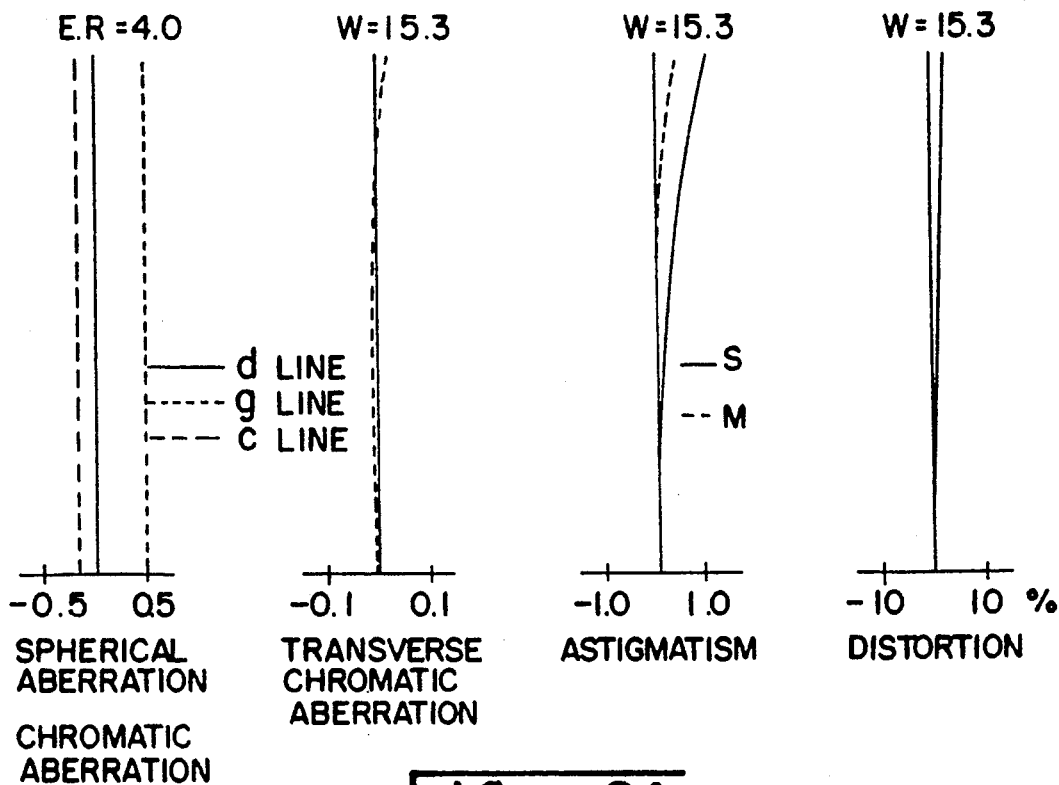
Figure 24:
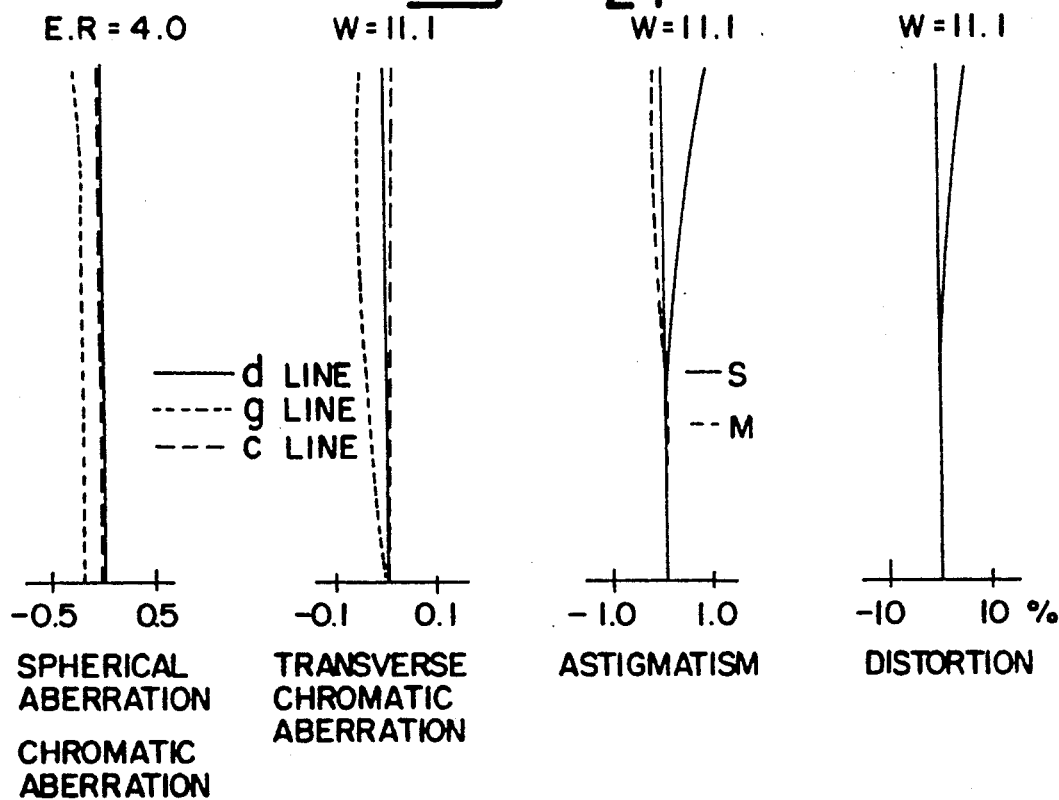
Figure 25:
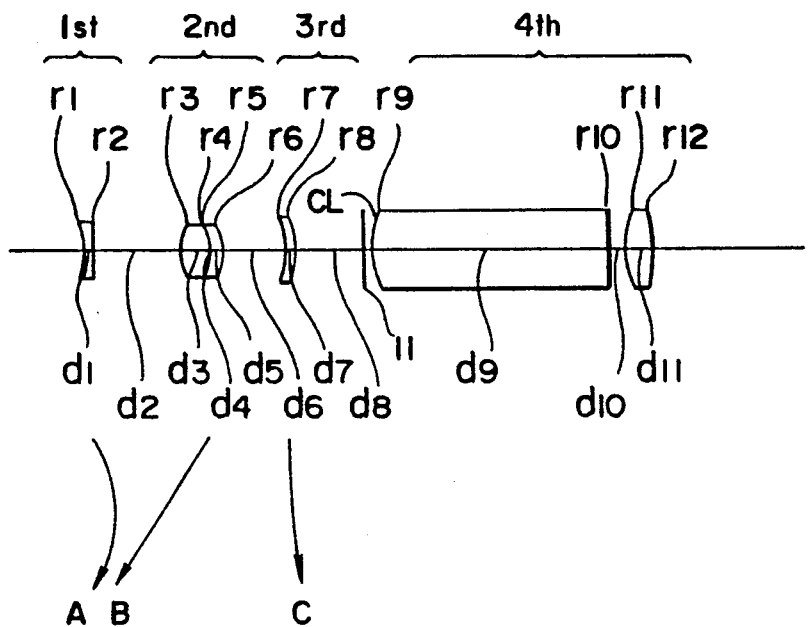
Figure 26:
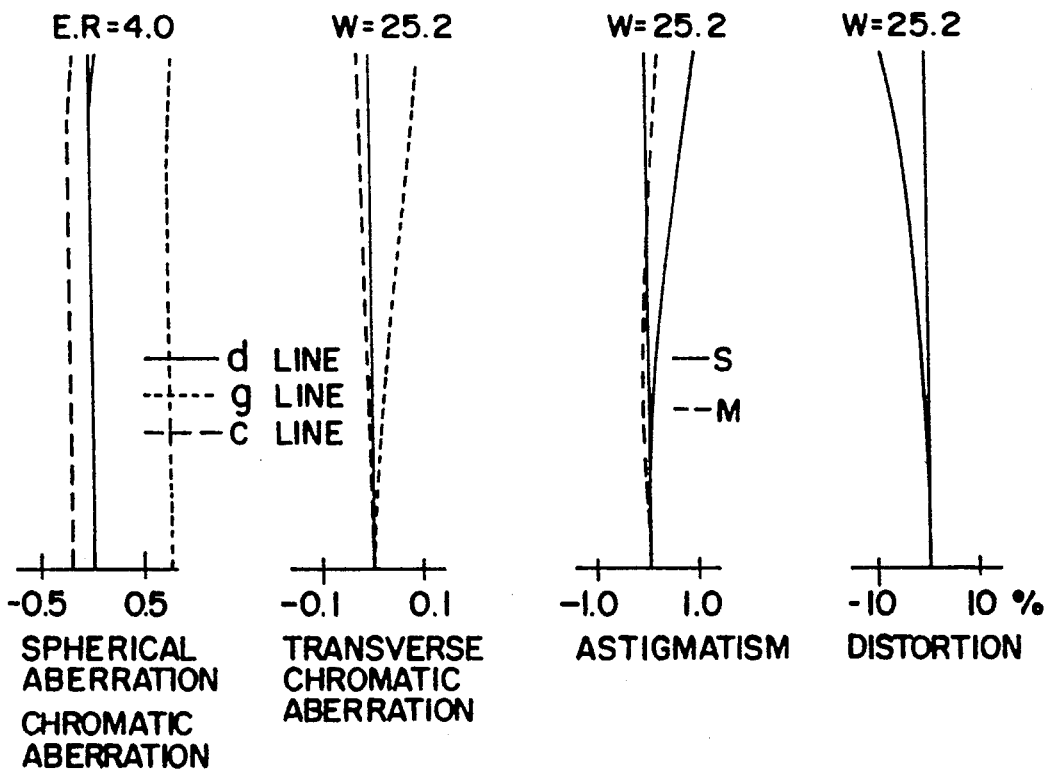
Figure 29:
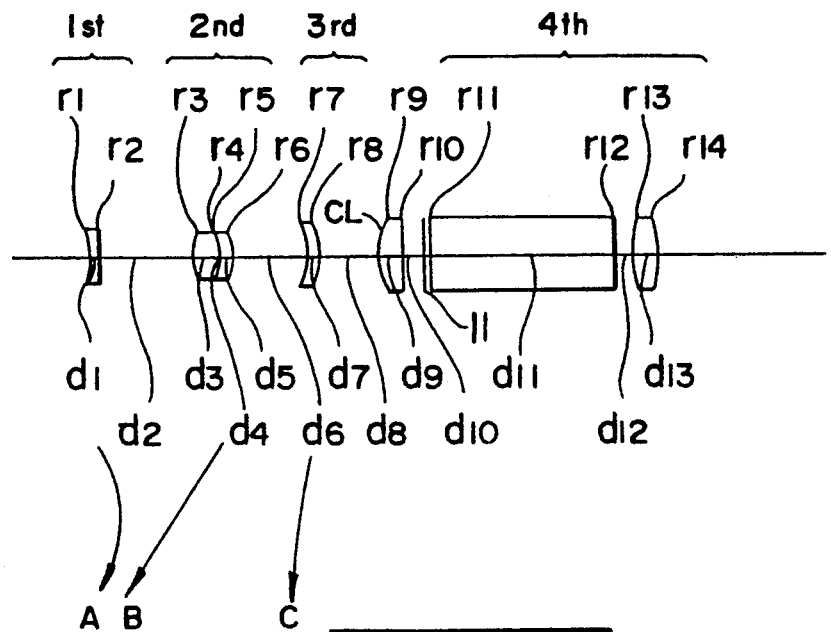
Figure 30:
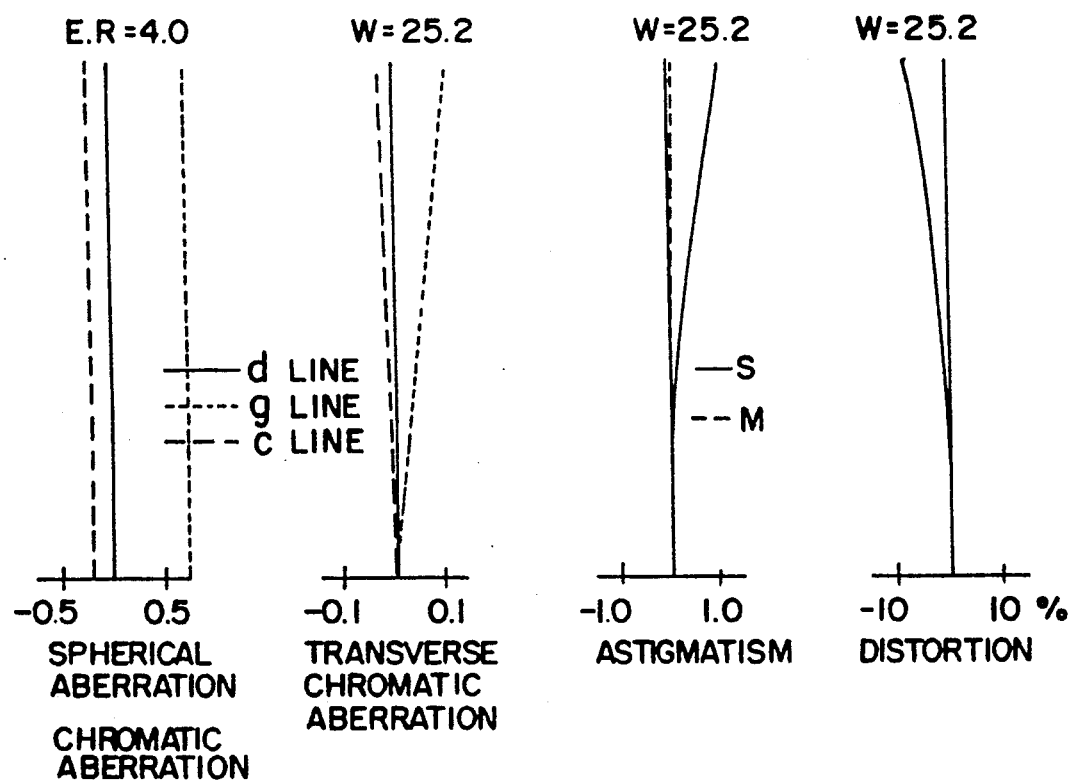
Figure 33:
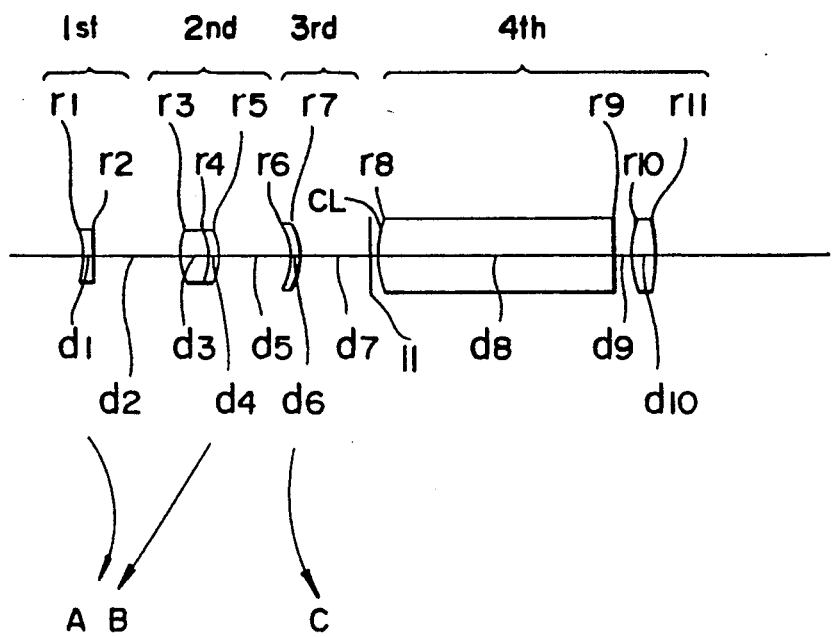
Figure 34:
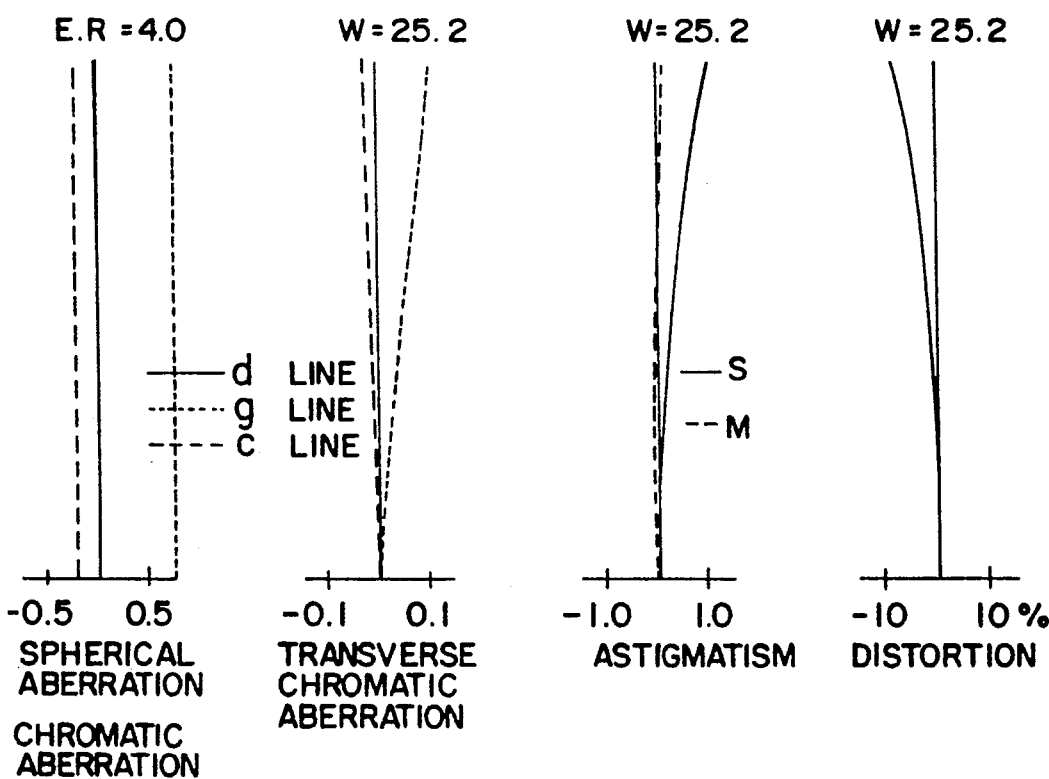
Figure 37:
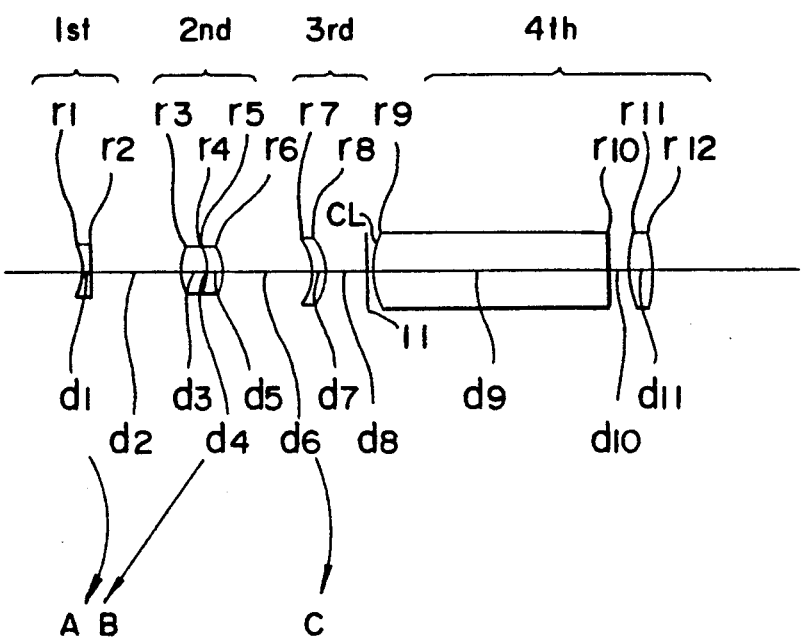
Figure 38:
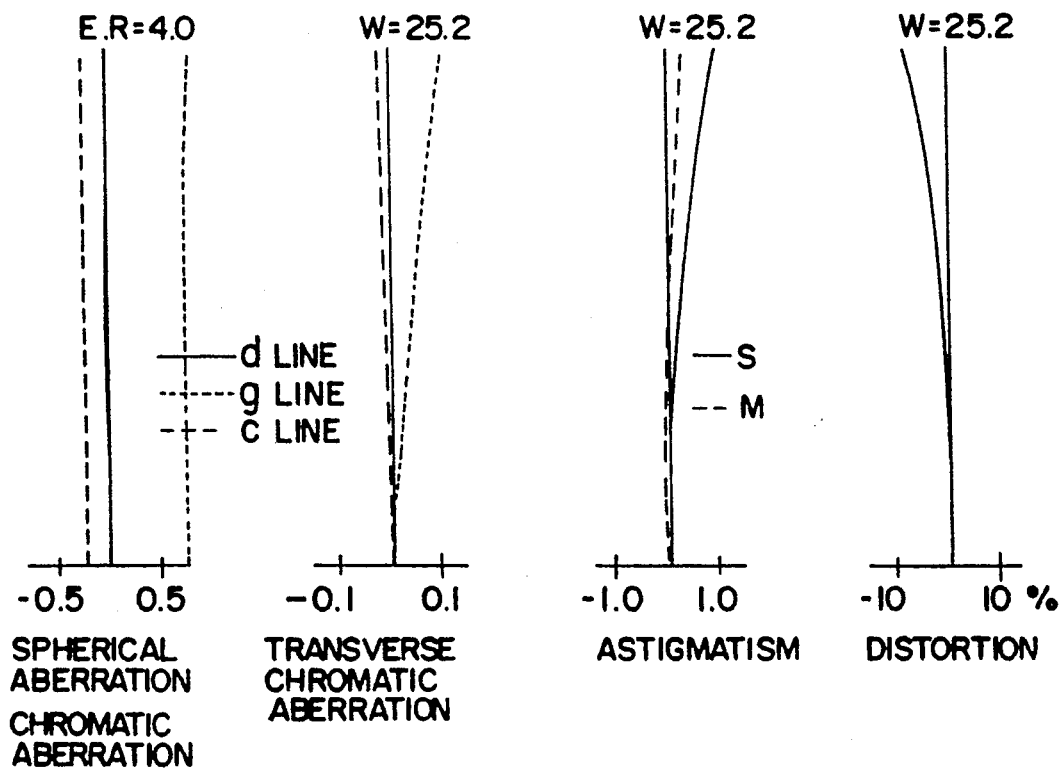
Figure 43:
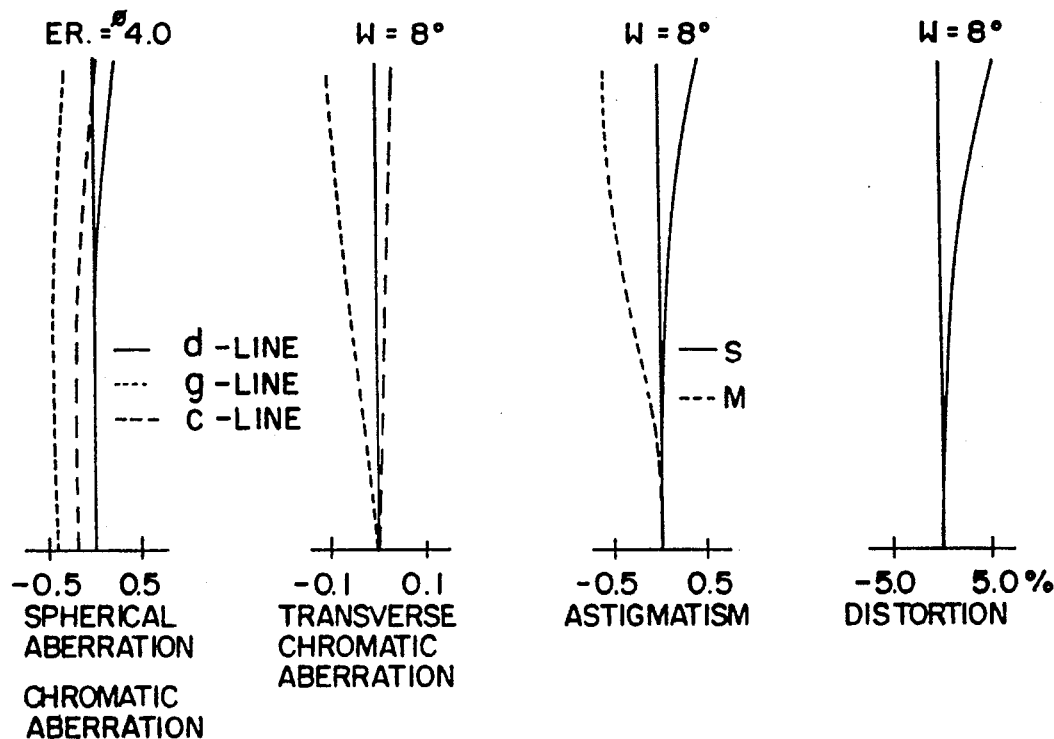
FIGS. 43, 46, and 49 are diagrams of various kinds of aberrations at a telephoto extremity, in the eleventh through thirteenth embodiments of the present invention, respectively.
Figure 41:
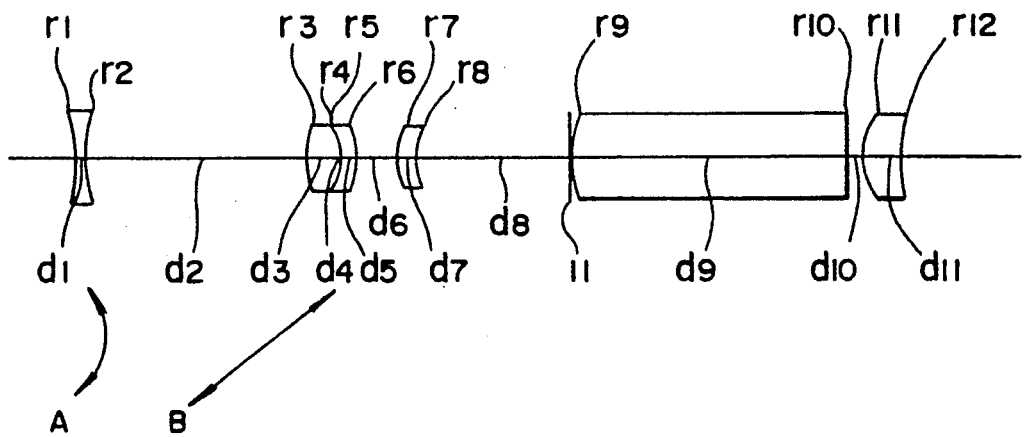
FIGS. 41, 44, and 47 are schematic views showing an arrangement of lenses, according to the eleventh through thirteenth embodiments of the present invention, respectively.
Figure 44:
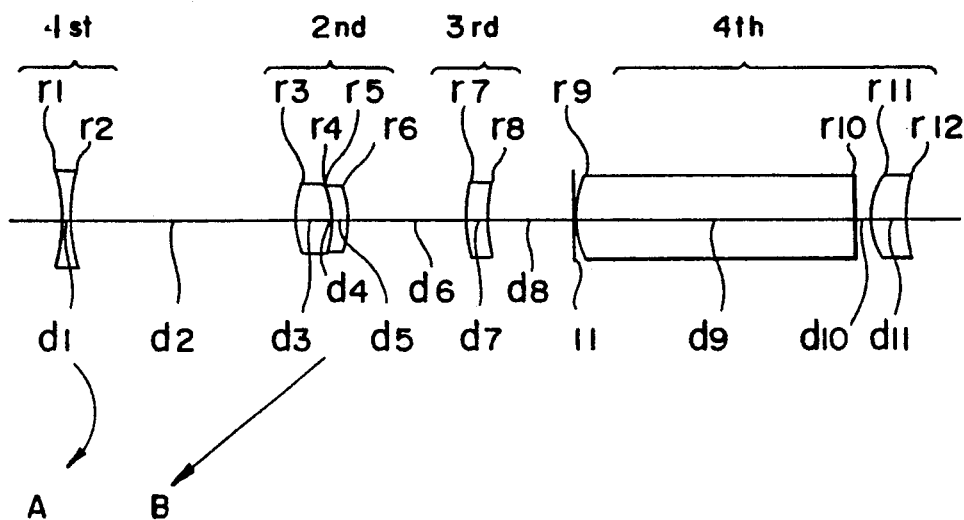
Figure 42:
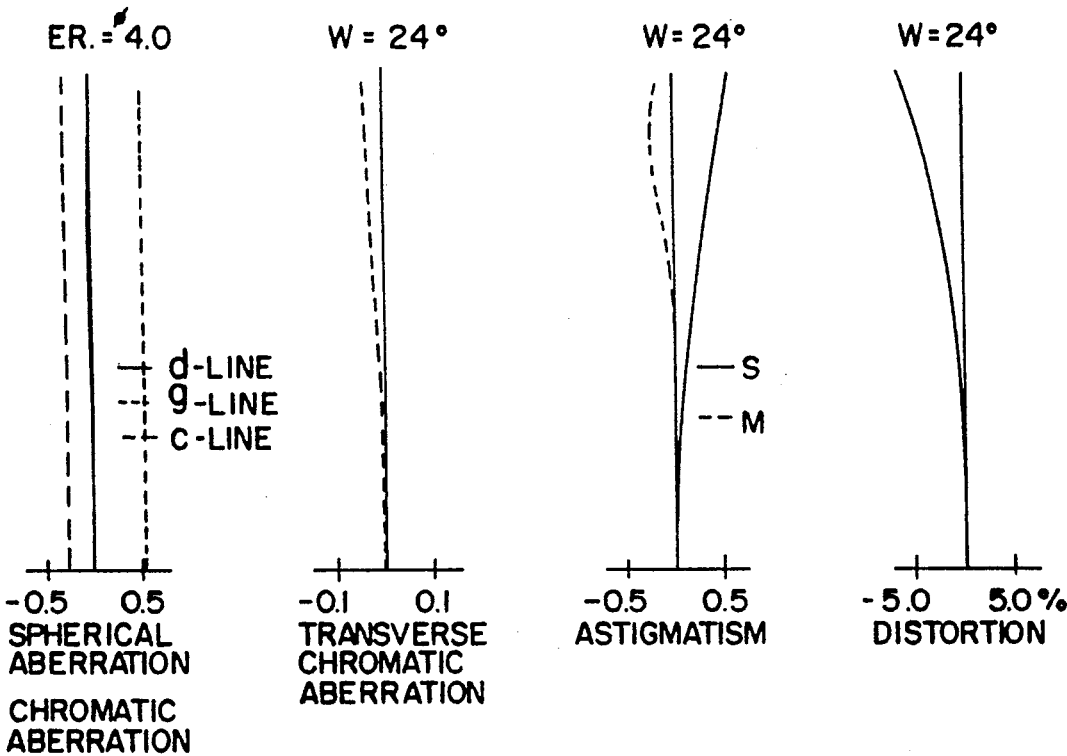
FIGS. 42, 45, and 48 are diagrams of various kinds of aberrations at a wide-angle extremity, in the eleventh through thirteenth embodiments of the present invention, respectively.
Figure 45:
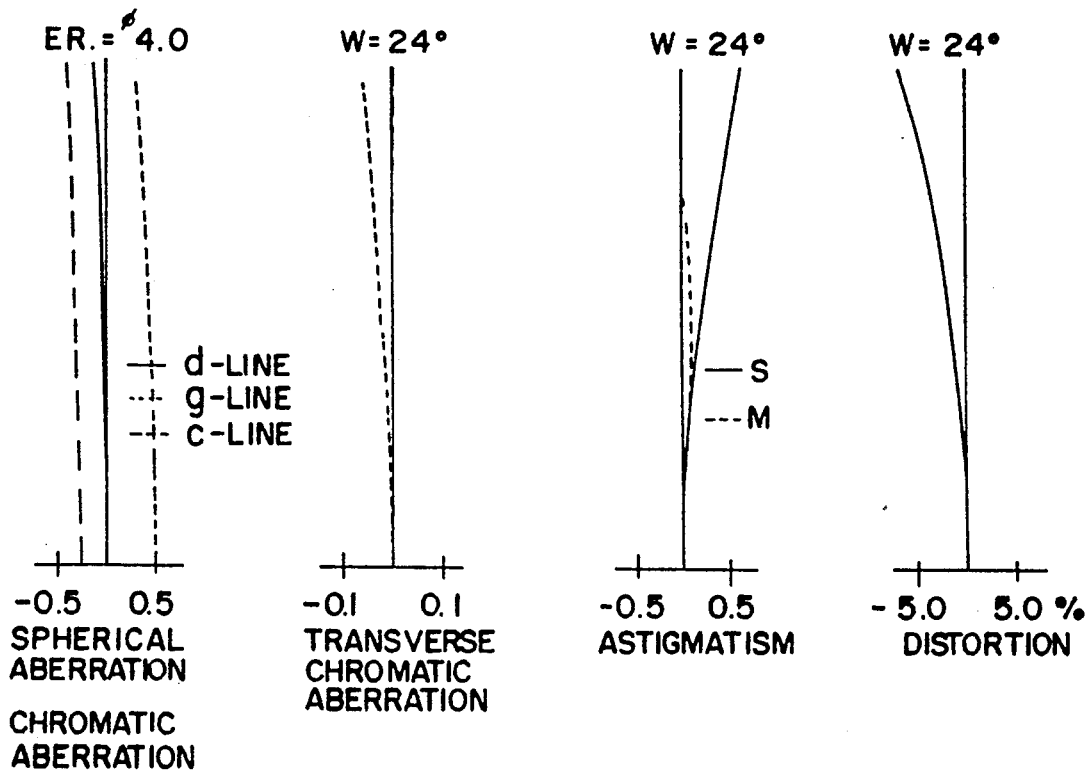
Figure 46:
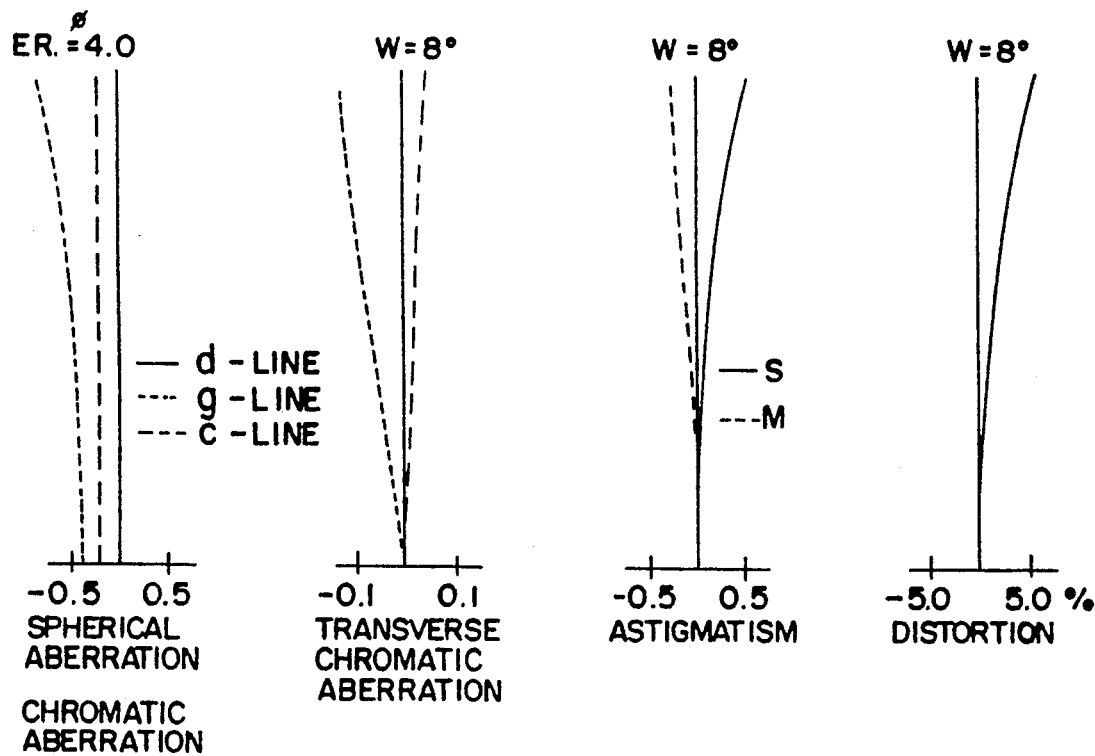
Figure 47:
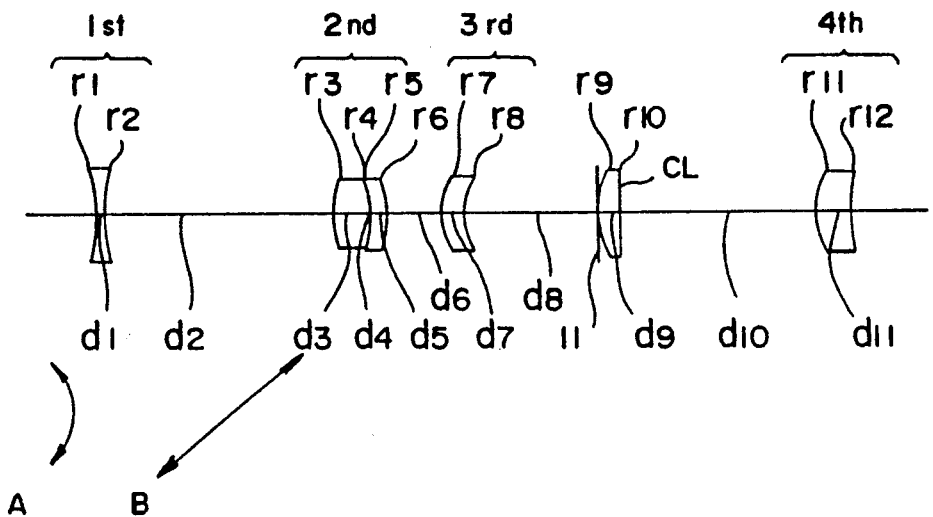
Figure 48:
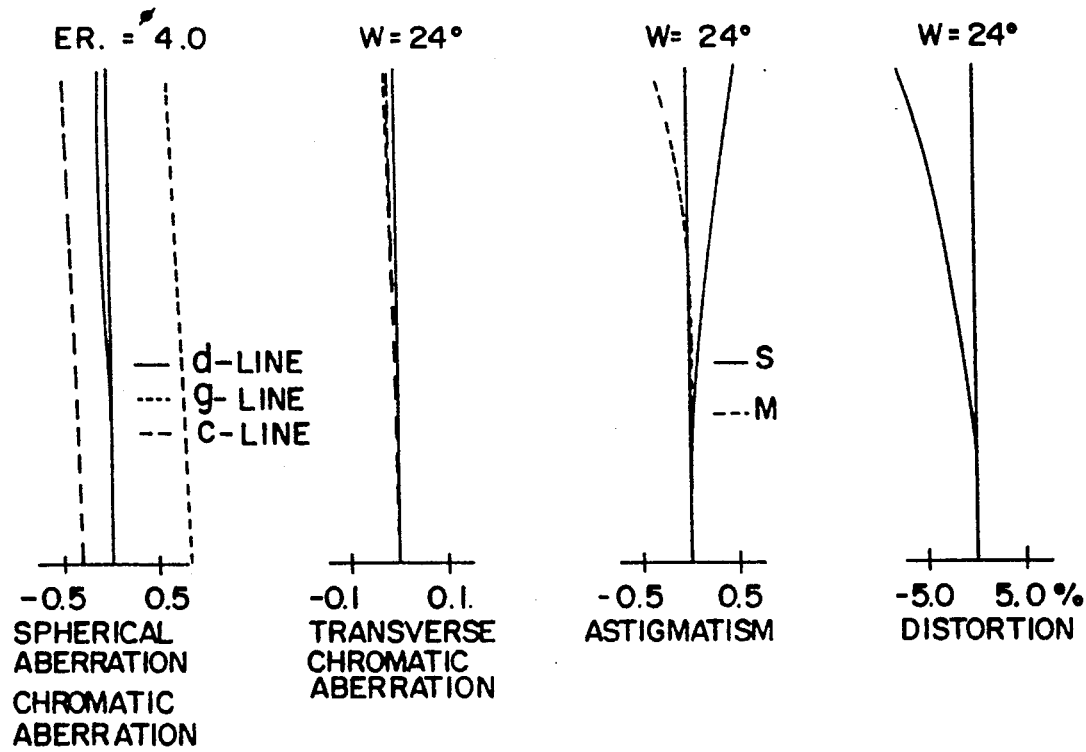
Figure 49:
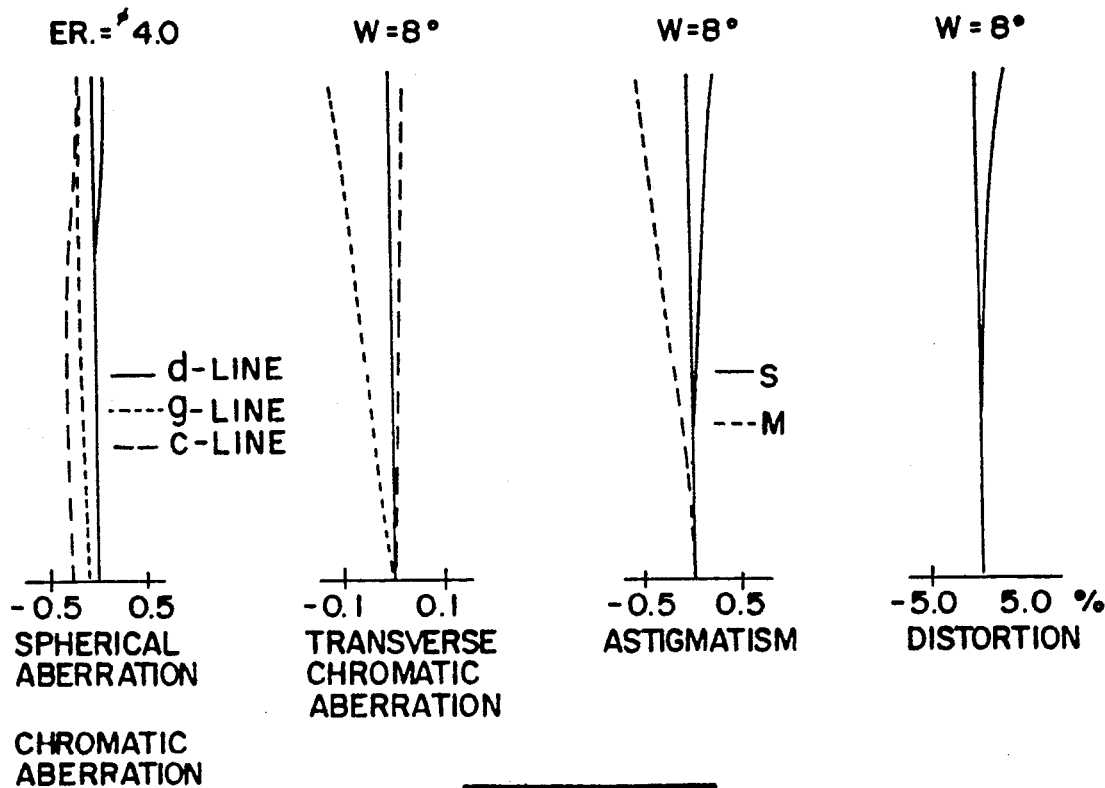

In the illustrated embodiments, "r" designates the radius of curvature of each surface of the lenses, "d" the thickness of the lenses or the distance between the lenses, "ω" the half field angle, "S" the sagittal ray, "M" the meridional ray, and "E.R" the radius of the exit pupil, respectively.

FIGS. 1, 5, 9, 13, 17, 21, 25, 29, 33, 37, 41, 44, and 47 show thirteen different embodiments of a zoom finder of the present invention. In these embodiments, the zoom finder includes an objective optical system consisting of first, second and third lens groups, and a condensor lens CL, and an eye piece optical system consisting of a fourth lens group. The objective optical system has a positive power as a whole. The condensor lens CL, which is positive, is located near the image formed by the objective optical system. The condensor lens could be replaced with a curved entrance surface of an erect optical system such as a prism. The eye piece optical system includes an image erecting optical system and an eye piece and has a positive power as a whole.

In the first through sixth embodiments and eleventh through thirteenth embodiments, the second lens group is moved in the optical axis direction to effect the zooming (power variation), and the first lens group is moved along a track A which is curved with respect to the track B of the movement of the second lens group, in association with the movement of the second lens group to keep a constant diopter.

In the seventh through tenth embodiments, the third lens group is moved along tracks A and C which are curved with respect to the track B of the movement of the second lens group, in association with the movement of the first and second lens groups to effect the zooming and the adjustment of the diopter. Note that the power varying mechanism and the diopter adjusting mechanism can be realized by a cam mechanism, which is per se known. Numeral 11 designates the field frame of glass located in the vicinity of an image forming position in which an image is formed by the objective optical system.

FIGS. 2, 6, 10, 14, 18, 22, 26, 30, 34, 38, 42, 45, and 48 are diagrams of various kinds of aberrations at a wide-angle extremity, in the first through thirteenth embodiments of the present invention, respectively.

FIGS. 3, 7, 11, 15, 19, 23, 27, 31, 35, and 39 are diagrams of various kinds of aberrations at an intermediate angle of view (field angle), in the first through tenth embodiments of the present invention, respectively.

FIGS. 4, 8, 12, 16, 20, 24, 28, 32, 36, 40, 43, 46, and 49 are diagrams of various kinds of aberrations at a telephoto extremity, in the first through thirteenth embodiments of the present invention, respectively.

The radius of curvature r of each lens, the thickness d of each lens (or distance between the lenses), the refractive index n of each lens, the Abbe numbers, the conical coefficient k of each aspherical surface, and the fourth, sixth a aspherical coefficient A are shown in Tables 1 through 26 below for the first through thirteenth embodiment, respectively.

TABLE 1

| No. | r | d | n | ν |
|---|---|---|---|---|
| 1 | −18.013 | 1.50 | 1.58547 | 29.9 |
| 2 | 33.463 | 13.26~5.81~2.20 | — | — |
| 3 | 13.673 | 3.30 | 1.49176 | 57.4 |
| 4 | −7.256 | 0.20 | — | — |
| 5 | −7.000 | 1.50 | 1.58547 | 29.9 |
| 6 | −11.034 | 12.19~17.64~23.25 | — | — |
| 7 | −19.052 | 1.50 | 1.49176 | 57.4 |
| 8 | −15.000 | 6.95 | — | — |
| 9 | 13.709 | 3.00 | 1.49176 | 57.4 |
| 10 | ∞ | 3.75 | — | — |
| 11 | ∞ | 26.30 | 1.49176 | 57.4 |
| 12 | ∞ | 2.50 | — | — |
| 13 | 21.654 | 3.00 | 1.49176 | 57.4 |
| 14 | −28.198 | — | — | — |

TABLE 2

| No | k | $A_4$ | $A_6$ | $A_8$ | $A_{10}$ |
|---|---|---|---|---|---|
| 1 | $0.00000000 \times 10^0$ | $0.81101361 \times 10^{-4}$ | $-0.39813684 \times 10^{-5}$ | $0.78130552 \times 10^{-7}$ | |
| 3 | $0.00000000 \times 10^0$ | $-0.24114614 \times 10^{-3}$ | $0.11163578 \times 10^{-5}$ | $0.13819852 \times 10^{-6}$ | $-0.41407594 \times 10^{-8}$ |
| 7 | $0.00000000 \times 10^0$ | $-0.47466504 \times 10^{-4}$ | $-0.37673230 \times 10^{-5}$ | $0.60119323 \times 10^{-7}$ | |
| 13 | $0.00000000 \times 10^0$ | $-0.52471938 \times 10^{-4}$ | $0.75801586 \times 10^{-6}$ | $-0.14781965 \times 10^{-7}$ | |

TABLE 3

| No. | r | d | n | ν |
|---|---|---|---|---|
| 1 | −16.092 | 1.50 | 1.58547 | 29.9 |
| 2 | 29.403 | 12.86~5.73~2.25 | — | — |
| 3 | 12.927 | 3.30 | 1.49176 | 57.4 |
| 4 | −7.000 | 1.50 | 1.58547 | 29.9 |
| 5 | −10.197 | 12.19~16.98~22.01 | — | — |
| 6 | −14.000 | 1.50 | 1.49176 | 57.4 |
| 7 | −15.000 | 7.50 | — | — |
| 8 | 12.719 | 33.00 | 1.49176 | 57.4 |
| 9 | ∞ | 2.50 | — | — |
| 10 | 18.751 | 3.00 | 1.49176 | 57.4 |
| 11 | −37.918 | — | — | — |

TABLE 4

| No | k | $A_4$ | $A_6$ | $A_8$ | $A_{10}$ |
|---|---|---|---|---|---|
| 1 | $0.00000000 \times 10^0$ | $0.11965375 \times 10^{-3}$ | $-063955394 \times 10^{-5}$ | $0.12644180 \times 10^{-6}$ | |
| 3 | $0.00000000 \times 10^0$ | $-0.38990414 \times 10^{-3}$ | $0.11200321 \times 10^{-4}$ | $-0.11791089 \times 10^{-5}$ | $0.58158491 \times 10^{-7}$ |
| 7 | $0.00000000 \times 10^0$ | $-0.27915870 \times 10^{-4}$ | $0.64070920 \times 10^{-5}$ | $-0.90579266 \times 10^{-7}$ | |
| 10 | $0.00000000 \times 10^0$ | $-0.58140847 \times 10^{-4}$ | $0.53544062 \times 10^{-6}$ | $-0.11759511 \times 10^{-7}$ | |

TABLE 5

| No. | r | d | n | ν |
|---|---|---|---|---|
| 1 | −19.511 | 1.50 | 1.58547 | 29.9 |
| 2 | 29.555 | 13.35~5.84~2.20 | — | — |
| 3 | 14.510 | 3.30 | 1.49176 | 57.4 |
| 4 | −7.513 | 0.20 | — | — |

TABLE 5-continued

| No. | r | d | n | ν |
|---|---|---|---|---|
| 5 | −7.000 | 1.50 | 1.58547 | 29.9 |
| 6 | −10.288 | 11.80~17.29~22.95 | — | — |
| 7 | 15.600 | 1.50 | 1.49176 | 57.4 |
| 8 | 16.000 | 6.95 | — | — |
| 9 | 12.177 | 3.00 | 1.49176 | 57.4 |
| 10 | ∞ | 3.75 | — | — |
| 11 | ∞ | 26.30 | 1.49176 | 57.4 |
| 12 | ∞ | 2.50 | — | — |
| 13 | 17.750 | 3.00 | 1.49176 | 57.4 |
| 14 | −38.543 | — | — | — |

TABLE 6

| No | k | $A_4$ | $A_6$ | $A_8$ | $A_{10}$ |
|---|---|---|---|---|---|
| 1 | $0.00000000 \times 10^0$ | $0.44661273 \times 10^{-4}$ | $-0.28316810 \times 10^{-5}$ | $0.64833862 \times 10^{-7}$ | |
| 3 | $0.00000000 \times 10^0$ | $-0.24234317 \times 10^{-3}$ | $0.12006849 \times 10^{-4}$ | $-0.91373554 \times 10^{-6}$ | $0.33631851 \times 10^{-7}$ |
| 7 | $0.00000000 \times 10^0$ | $-0.70849612 \times 10^{-4}$ | $0.83519218 \times 10^{-6}$ | $-0.29079523 \times 10^{-7}$ | |
| 13 | $0.00000000 \times 10^0$ | $-0.51312560 \times 10^{-4}$ | $0.76879425 \times 10^{-6}$ | $-0.18619330 \times 10^{-7}$ | |

TABLE 7

| No. | r | d | n | ν |
|---|---|---|---|---|
| 1 | −16.678 | 1.50 | 1.58547 | 29.9 |
| 2 | 37.624 | 13.37~5.88~2.26 | — | — |
| 3 | 15.192 | 3.30 | 1.49176 | 57.4 |
| 4 | −7.000 | 1.50 | 1.58547 | 29.9 |
| 5 | −10.761 | 12.28~17.76~23.41 | — | — |
| 6 | 15.000 | 1.50 | 1.49176 | 57.4 |
| 7 | 14.000 | 6.95 | — | — |
| 8 | 11.933 | 3.00 | 1.49176 | 57.4 |
| 9 | ∞ | 3.75 | — | — |
| 10 | ∞ | 26.30 | 1.49176 | 57.4 |
| 11 | ∞ | 2.50 | — | — |
| 12 | 21.527 | 3.00 | 1.49176 | 57.4 |
| 13 | −28.400 | — | — | — |

TABLE 8

| No | k | $A_4$ | $A_6$ | $A_8$ | $A_{10}$ |
|---|---|---|---|---|---|
| 1 | $0.00000000 \times 10^0$ | $0.52920287 \times 10^{-4}$ | $-0.95057410 \times 10^{-6}$ | $-0.10556109 \times 10^{-7}$ | |
| 3 | $0.00000000 \times 10^0$ | $-0.26828722 \times 10^{-3}$ | $0.43591719 \times 10^{-5}$ | $-0.25338686 \times 10^{-6}$ | $0.79198086 \times 10^{-8}$ |
| 7 | $0.00000000 \times 10^0$ | $-0.18644151 \times 10^{-4}$ | $0.46113494 \times 10^{-5}$ | $-0.78506128 \times 10^{-7}$ | |
| 12 | $0.00000000 \times 10^0$ | $-0.47365798 \times 10^{-4}$ | $0.58685949 \times 10^{-6}$ | $-0.13212381 \times 10^{-7}$ | |

TABLE 9

| No. | r | d | n | ν |
|---|---|---|---|---|
| 1 | −21.476 | 1.50 | 1.58547 | 29.9 |
| 2 | 27.151 | 13.45~5.87~2.20 | — | — |
| 3 | 13.734 | 3.30 | 1.49176 | 57.4 |
| 4 | −7.000 | 1.50 | 1.58547 | 29.9 |
| 5 | −11.689 | 12.20~17.75~23.47 | — | — |
| 6 | 120.000 | 1.50 | 1.49176 | 57.4 |
| 7 | −120.000 | 6.95 | — | — |
| 8 | 13.588 | 3.00 | 1.49176 | 57.4 |
| 9 | ∞ | 3.75 | — | — |
| 10 | ∞ | 26.30 | 1.49176 | 57.4 |
| 11 | ∞ | 2.50 | — | — |
| 12 | 16.879 | 3.00 | 1.49176 | 57.4 |
| 13 | −43.101 | — | — | — |

TABLE 10

| No | k | $A_4$ | $A_6$ | $A_8$ | $A_{10}$ |
|---|---|---|---|---|---|
| 1 | $0.00000000 \times 10^0$ | $0.94292204 \times 10^{-4}$ | $-0.42429243 \times 10^{-5}$ | $0.59642354 \times 10^{-7}$ | |
| 3 | $0.00000000 \times 10^0$ | $-0.26382890 \times 10^{-3}$ | $0.81871518 \times 10^{-6}$ | $0.89020255 \times 10^{-6}$ | $-0.59867404 \times 10^{-7}$ |
| 6 | $0.00000000 \times 10^0$ | $-0.45709111 \times 10^{-4}$ | $-0.15261692 \times 10^{-5}$ | $0.27601909 \times 10^{-7}$ | |
| 12 | $0.00000000 \times 10^0$ | $-0.64118803 \times 10^{-4}$ | $0.11370907 \times 10^{-5}$ | $-0.21739471 \times 10^{-7}$ | |

TABLE 11

| No. | r | d | n | ν |
|---|---|---|---|---|
| 1 | −15.101 | 1.50 | 1.58547 | 29.9 |
| 2 | 34.851 | 13.35~6.22~2.76 | — | — |
| 3 | 14.086 | 3.30 | 1.49176 | 57.4 |
| 4 | −7.000 | 0.20 | — | — |
| 5 | −6.292 | 1.50 | 1.58547 | 29.9 |
| 6 | −9.076 | 12.10~17.30~22.66 | — | — |
| 7 | −120.00 | 1.50 | 1.49176 | 57.4 |
| 8 | 120.00 | 6.95 | — | — |
| 9 | 11.612 | 3.00 | 1.49176 | 57.4 |
| 10 | ∞ | 3.75 | — | — |
| 11 | ∞ | 26.30 | 1.49176 | 57.4 |
| 12 | ∞ | 2.50 | — | — |
| 13 | 22.324 | 3.00 | 1.49176 | 57.4 |
| 14 | −27.214 | — | — | — |

TABLE 12

| No | k | $A_4$ | $A_6$ | $A_8$ | $A_{10}$ |
|---|---|---|---|---|---|
| 1 | $0.00000000 \times 10^0$ | $0.83468538 \times 10^{-4}$ | $-0.17167291 \times 10^{-5}$ | $0.16180457 \times 10^{-7}$ | |
| 3 | $0.00000000 \times 10^0$ | $-0.21849649 \times 10^{-3}$ | $0.31843926 \times 10^{-5}$ | $-0.76244870 \times 10^{-7}$ | $0.16286400 \times 10^{-7}$ |
| 8 | $0.00000000 \times 10^0$ | $-0.88273681 \times 10^{-4}$ | $0.86934534 \times 10^{-5}$ | $-0.12336185 \times 10^{-6}$ | |
| 13 | $0.00000000 \times 10^0$ | $-0.56046414 \times 10^{-4}$ | $0.89621935 \times 10^{-6}$ | $-0.18985907 \times 10^{-7}$ | |

TABLE 13

| No. | r | d | n | ν |
|---|---|---|---|---|
| 1 | −19.359 | 1.50 | 1.58547 | 29.9 |
| 2 | 26.212 | 12.70~5.54~2.20 | — | — |
| 3 | 12.492 | 3.30 | 1.49176 | 57.4 |
| 4 | −7.286 | 0.20 | — | — |
| 5 | −7.000 | 1.50 | 1.58547 | 29.9 |
| 6 | −10.779 | 8.65~14.09~21.69 | — | — |
| 7 | −18.981 | 1.50 | 1.49176 | 57.4 |
| 8 | −15.000 | 11.05~10.81~8.51 | — | — |
| 9 | 13.624 | 33.00 | 1.49176 | 57.4 |
| 10 | ∞ | 2.50 | — | — |
| 11 | 18.255 | 3.00 | 1.49176 | 57.4 |
| 12 | −39.998 | — | — | — |

TABLE 14

| No | k | $A_4$ | $A_6$ | $A_8$ | $A_{10}$ |
|---|---|---|---|---|---|
| 1 | $0.00000000 \times 10^0$ | $0.62376227 \times 10^{-4}$ | $-0.32361366 \times 10^{-5}$ | $0.48463827 \times 10^{-7}$ | |
| 3 | $0.00000000 \times 10^0$ | $-0.30091925 \times 10^{-3}$ | $0.14163289 \times 10^{-4}$ | $-0.14973784 \times 10^{-5}$ | $0.65656513 \times 10^{-7}$ |
| 7 | $0.00000000 \times 10^0$ | $-0.65451842 \times 10^{-4}$ | $0.43859191 \times 10^{-5}$ | $0.67094806 \times 10^{-7}$ | |
| 11 | $0.00000000 \times 10^0$ | $-0.65181575 \times 10^{-4}$ | $0.11367382 \times 10^{-5}$ | $-0.21845290 \times 10^{-7}$ | |

TABLE 15

| No. | r | d | n | ν |
|---|---|---|---|---|
| 1 | −18.041 | 1.50 | 1.58547 | 29.9 |
| 2 | 32.978 | 13.27~5.79~2.20 | — | — |
| 3 | 13.537 | 3.30 | 1.49176 | 57.4 |
| 4 | −7.221 | 0.20 | — | — |
| 5 | −7.000 | 1.50 | 1.58547 | 29.9 |
| 6 | −11.130 | 10.31~15.30~20.92 | — | — |
| 7 | −17.659 | 1.50 | 1.49176 | 57.4 |
| 8 | −15.000 | 8.83~9.28~9.28 | — | — |
| 9 | 13.416 | 3.00 | 1.49176 | 57.4 |
| 10 | ∞ | 3.75 | — | — |
| 11 | ∞ | 26.30 | 1.49176 | 57.4 |
| 12 | ∞ | 2.50 | — | — |
| 13 | 23.170 | 3.00 | 1.49176 | 57.4 |
| 14 | −26.140 | — | — | — |

TABLE 16

| No | k | $A_4$ | $A_6$ | $A_8$ | $A_{10}$ |
|---|---|---|---|---|---|
| 1 | $0.00000000 \times 10^0$ | $0.72586053 \times 10^{-4}$ | $-0.43124247 \times 10^{-5}$ | $0.89389364 \times 10^{-7}$ | |
| 3 | $0.00000000 \times 10^0$ | $-0.25117787 \times 10^{-3}$ | $0.59911863 \times 10^{-5}$ | $-0.45585348 \times 10^{-6}$ | $0.18478171 \times 10^{-7}$ |
| 7 | $0.00000000 \times 10^0$ | $-0.54571985 \times 10^{-4}$ | $-0.30814713 \times 10^{-5}$ | $0.54894592 \times 10^{-7}$ | |
| 13 | $0.00000000 \times 10^0$ | $-0.50696636 \times 10^{-4}$ | $0.84118825 \times 10^{-6}$ | $-0.16330238 \times 10^{-7}$ | |

TABLE 17

| No. | r | d | n | ν |
|---|---|---|---|---|
| 1 | −17.827 | 1.50 | 1.58547 | 29.9 |
| 2 | 26.439 | 12.38~5.38~2.20 | — | — |
| 3 | 12.986 | 3.30 | 1.49176 | 57.4 |
| 4 | −7.000 | 1.50 | 1.58547 | 29.9 |
| 5 | −10.521 | 9.69~14.32~22.84 | — | — |
| 6 | −11.518 | 1.50 | 1.49176 | 57.4 |
| 7 | −10.500 | 10.53~11.03~7.55 | — | — |
| 8 | 13.717 | 33.00 | 1.49176 | 57.4 |
| 9 | ∞ | 2.50 | — | — |
| 10 | 19.331 | 3.00 | 1.49176 | 57.4 |
| 11 | −35.864 | — | — | — |

TABLE 18

| No | k | $A_4$ | $A_6$ | $A_8$ | $A_{10}$ |
|---|---|---|---|---|---|
| 1 | $0.00000000 \times 10^0$ | $0.58745023 \times 10^{-4}$ | $-0.37964182 \times 10^{-5}$ | $0.69728217 \times 10^{-7}$ | |
| 3 | $0.00000000 \times 10^0$ | $-0.32983553 \times 10^{-3}$ | $0.11377360 \times 10^{-4}$ | $-0.13250893 \times 10^{-5}$ | $0.65680920 \times 10^{-7}$ |
| 6 | $0.00000000 \times 10^0$ | $-0.10818782 \times 10^{-3}$ | $-0.34471067 \times 10^{-5}$ | $0.31924624 \times 10^{-7}$ | |
| 10 | $0.00000000 \times 10^0$ | $-0.60110881 \times 10^{-4}$ | $0.10250677 \times 10^{-5}$ | $-1.18196969 \times 10^{-7}$ | |

TABLE 19

| No. | r | d | n | ν |
|---|---|---|---|---|
| 1 | −16.027 | 1.50 | 1.58547 | 29.9 |
| 2 | 31.070 | 12.52~5.66~2.20 | — | — |
| 3 | 12.606 | 3.30 | 1.49176 | 57.4 |
| 4 | −7.084 | 0.20 | — | — |
| 5 | −7.000 | 1.50 | 1.58547 | 29.9 |
| 6 | −10.635 | 12.64~18.51~23.35 | — | — |
| 7 | −9.035 | 1.50 | 1.49176 | 57.4 |
| 8 | −8.138 | 7.24~6.35~6.85 | — | — |
| 9 | 14.208 | 33.00 | 1.49176 | 57.4 |
| 10 | ∞ | 2.50 | — | — |
| 11 | 19.068 | 3.00 | 1.49176 | 57.4 |
| 12 | −36.752 | — | — | — |

TABLE 20

| No | k | $A_4$ | $A_6$ | $A_8$ | $A_{10}$ |
|---|---|---|---|---|---|
| 1 | $0.00000000 \times 10^0$ | $0.86106878 \times 10^{-4}$ | $-0.31349467 \times 10^{-5}$ | $0.48111393 \times 10^{-7}$ | |
| 3 | $0.00000000 \times 10^0$ | $-0.39271828 \times 10^{-3}$ | $0.24853487 \times 10^{-4}$ | $-0.32332168 \times 10^{-5}$ | $0.15079434 \times 10^{-6}$ |
| 7 | $0.00000000 \times 10^0$ | $-0.22304820 \times 10^{-3}$ | $-0.33464554 \times 10^{-5}$ | $-0.31640380 \times 10^{-8}$ | |
| 11 | $0.00000000 \times 10^0$ | $-0.55054926 \times 10^{-4}$ | $0.64567346 \times 10^{-6}$ | $-0.15042530 \times 10^{-7}$ | |

TABLE 21

| No. | r | d | n | ν |
|---|---|---|---|---|
| 1 | −29.688 | 1.80 | 1.49176 | 57.4 |
| 2 | 25.920 | 32.44~6.200 | — | — |
| 3 | 18.228 | 5.00 | 1.49176 | 57.4 |
| 4 | −10.154 | 0.20 | — | — |
| 5 | −10.788 | 2.00 | 1.80518 | 25.4 |
| 6 | −18.093 | 17.41~40.87 | — | — |
| 7 | 23.998 | 3.00 | 1.49176 | 57.4 |
| 8 | 28.516 | 12.57 | — | — |
| 9 | 17.416 | 40.63 | 1.49176 | 57.4 |
| 10 | ∞ | 2.50 | — | — |
| 11 | 12.751 | 5.40 | 1.49176 | 57.4 |
| 12 | 73.330 | — | — | — |

TABLE 22

| No | k | $A_{i4}$ | $A_{i6}$ | $A_{i8}$ |
|---|---|---|---|---|
| 1 | $-0.74900000 \times 10^1$ | $0.00000000 \times 10^0$ | $-0.67500000 \times 10^{-6}$ | $0.61000000 \times 10^{-8}$ |
| 3 | $-0.18100000 \times 10^1$ | $-0.37300000 \times 10^{-4}$ | $0.62400000 \times 10^{-6}$ | $-0.31350000 \times 10^{-7}$ |
| 7 | $-0.69000000 \times 10^1$ | $0.00000000 \times 10^0$ | $0.11300000 \times 10^{-7}$ | $0.00000000 \times 10^0$ |
| 11 | $0.76390000 \times 10^0$ | $0.24280000 \times 10^{-4}$ | $-0.59200000 \times 10^{-6}$ | $0.13340000 \times 10^{-7}$ |
| 12 | $0.00000000 \times 10^0$ | $0.19400000 \times 10^{-3}$ | $-0.11250000 \times 10^{-5}$ | $0.59500000 \times 10^{-7}$ |

TABLE 23

| No. | r | d | n | ν |
|---|---|---|---|---|
| 1 | −21.292 | 1.80 | 1.49176 | 57.4 |
| 2 | 32.878 | 32.51~5.38 | — | — |
| 3 | 21.660 | 5.00 | 1.49176 | 57.4 |
| 4 | −7.769 | 2.00 | 1.80518 | 25.4 |
| 5 | −12.047 | 5.99~24.47 | — | — |
| 6 | 14.072 | 3.00 | 1.49176 | 57.4 |
| 7 | 10.481 | 22.70 | — | — |
| 8 | 15.440 | 42.00 | 1.49176 | 57.4 |
| 9 | ∞ | 2.50 | — | — |
| 10 | 12.765 | 5.40 | 1.49176 | 57.4 |
| 11 | 78.585 | | | |

TABLE 24

| No | k | $A_{i4}$ | $A_{i6}$ | $A_{i8}$ |
|---|---|---|---|---|
| 1 | $-0.34786192 \times 10^1$ | $0.00000000 \times 10^0$ | $-0.41446806 \times 10^{-6}$ | $0.44376580 \times 10^{-8}$ |
| 3 | $-0.17642562 \times 10^1$ | $-0.42529237 \times 10^{-4}$ | $0.30444362 \times 10^{-6}$ | $0.12533558 \times 10^{-7}$ |
| 10 | $0.30562449 \times 10^0$ | $0.79880176 \times 10^{-4}$ | $0.10716974 \times 10^{-6}$ | $0.60035087 \times 10^{-8}$ |
| 11 | $0.00000000 \times 10^0$ | $0.23461768 \times 10^{-3}$ | $0.44353360 \times 10^{-6}$ | $0.19874932 \times 10^{-7}$ |

TABLE 25

| No. | r | d | n | ν |
|---|---|---|---|---|
| 1 | −24.904 | 1.80 | 1.49176 | 57.4 |
| 2 | 29.019 | 33.36~6.93 | — | — |
| 3 | 18.796 | 5.00 | 1.49176 | 57.4 |
| 4 | −9.803 | 0.20 | — | — |
| 5 | −10.331 | 2.00 | 1.80518 | 25.4 |
| 6 | −17.050 | 8.21~30.76 | — | — |
| 7 | 9.971 | 3.00 | 1.49176 | 57.4 |
| 8 | 8.379 | 19.62 | — | — |
| 9 | 16.599 | 3.00 | 1.49176 | 57.4 |
| 10 | ∞ | 28.64 | — | — |
| 11 | 12.765 | 5.40 | 1.49176 | 57.4 |
| 12 | 78.585 | — | — | — |

TABLE 26

| No | k | $A_{i4}$ | $A_{i6}$ | $A_{i8}$ |
|---|---|---|---|---|
| 1 | $-0.85809377 \times 10^1$ | $0.00000000 \times 10^0$ | $-0.59454011 \times 10^{-6}$ | $0.58323280 \times 10^{-8}$ |
| 3 | $-0.19156488 \times 10^1$ | $-0.54162735 \times 10^{-4}$ | $0.72361394 \times 10^{-6}$ | $-0.36248437 \times 10^{-7}$ |
| 11 | $0.11731406 \times 10^{-1}$ | $0.89486651 \times 10^{-5}$ | $-0.33933025 \times 10^{-6}$ | $-0.90273365 \times 10^{-8}$ |
| 12 | $0.00000000 \times 10^1$ | $0.12873350 \times 10^{-3}$ | $-0.14377288 \times 10^{-5}$ | $0.35499975 \times 10^{-9}$ |

Figure 52:
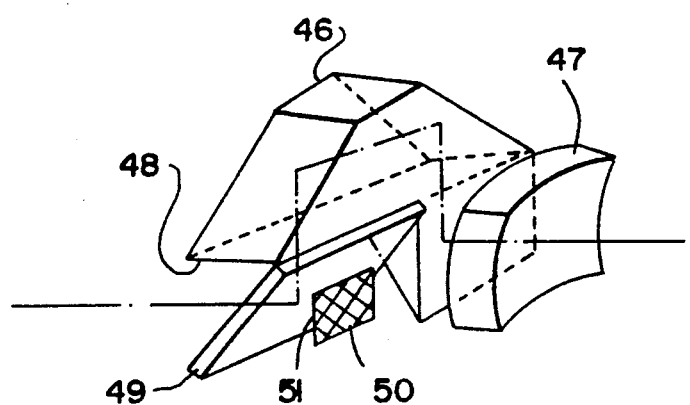
FIG. 52 is a perspective view of a main part of an optical system shown in FIG. 50.

The following discussion will be directed to another embodiment applied to a zoom finder having a photometering element, with reference to FIGS. 50~52.

The finder optical system includes a positive objective optical system having a first lens group 41, two (front and rear) second lens groups 42 and 43, and a third lens group 44, arranged in this order from the object side, and a positive eye piece optical system (4th group illustrated) having an image erecting optical system 46 and an eye piece 47.

The first lens group 41 is made of a concave-concave lens. The front second lens group 42 is made of a convex-convex lens, and the rear second lens group 43 is made of a meniscus lens having a negative power. The second lens groups 42 and 43 are spaced from one another at a predetermined distance and secured to each other so as to move together in the optical axis direction. The third lens group 44 is made Of a lens Of a Weak power. The second lens groups 42 and 43 are moved together in the optical axis direction to effect the zooming. The first lens group 41 is moved along the track A which is curved with respect to the movement of the second lens groups 42 and 43 along a track B, in association with the movement of the second lens groups 42 and 43 to maintain the diopter constant.

The image erecting optical system 46 is made of a prism which reflects light twice in the vertical direction and once in the horizontal direction. The eye piece 47 is a positive lens. The first surface of the image erecting optical system 46 forms a condenser lens portion 48 of a predetermined radius of curvature to function as a Condenser lens. The Condenser lens portion 48 forms an exit pupil at a predetermined position behind the eyepiece 47.

Behind the third lens group 44 is provided an optical path dividing element which is in the form of a half mirror 49 in the illustrated embodiment. The light flux emitted from the third lens group 44 is partly reflected by the half mirror 49 toward the condenser lens portion 48 of the image erecting optical system 46 and is then reflected three times in the image erecting optical system 46. The reflected light flux is then made incident upon and emitted from the eye piece 47. Consequently, the image of the object formed by the objective optical system (lens groups 41, 42, 43, and 44) is inverted in the vertical and horizontal directions by the half mirror 49 and the image erecting optical system 46, respectively, so that an erected real image can be observed through the eye piece 47.

The image forming plane is defined in a space between the half mirror 49 and the condenser portion 48 by the objective lenses 41, 42, 43 and 44. The glass field frame 45 is located in the vicinity of the image forming plane.

The photometering element (brightness measuring element) 50 is provided at a position substantially and optically equivalent to the field frame 45 behind the half mirror 49, that is, in the vicinity of the image forming plane of the objective optical system. The object light flux transmitted through the third lens group 44 partly passes the half mirror 49 and is converged onto or in the vicinity Of the light receiving surface of the photometering element 50.

As can be understood from the foregoing, since the photometering element 50 is provided in the object image forming plane by the objective optical system in the embodiment shown in FIGS. 50 through 52, no image forming lens for the photometering is necessary. Furthermore, since the photometering element 50 is disposed in the space behind the half mirror 49 remote from the condenser portion 48, as mentioned above, optimum photometering sensitivity distribution and optimum photometering characteristics can be easily selected by adjusting the position of the photometering element 50 in the space. Furthermore even if the field magnification varies in accordance With the zooming, the ratio of the photometering range to the field of view is substantially kept constant.

Preferably, the half mirror 49 is provided on its rear surface with a dispersion surface 51 which also makes it possible to select an optimum photometering sensitivity distribution and optimum photometering characteristics.

In the above-mentioned embodiment the half mirror 49 can be replaced with a beam splitter, which is per se known.

The above-mentioned discussion directed to the embodiment illustrated in FIGS. 50 through 52 can be applied to other finder optical systems, such as those shown in FIGS. 1, 5, 9, 13, 17, 21, 25, 29, 33, 37, 41, 44, and 47. In this case, the optical path dividing element is provided in front of the image forming plane (closer to the object) defined by the objective optical system, and the photometering element is disposed in one of the divided optical paths in the vicinity of the image forming plane.

As can be seen from the foregoing, according to the present invention, since the first lens group is moved in association with the operation of the variable power lens groups to keep a constant diopter, a clear finder image can be obtained even in a zoom finder of a high power ratio. Since at least one surface of the first lens group is an aspherical surface, no or little distortion takes place. Also, since at least one surface of the variable power lens groups is an aspherical surface, no or little spherical aberration occurs. The provision of the meniscus lens of a weak power provided in the vicinity of the focal point of the objective optical system contributes to a reduction of Petzval's theorem, thus resulting in a correction of astigmatism and curvature of the field.

Furthermore, since the optical path dividing optical element is provided in the vicinity of the focal point of the objective optical system and the photometering element is disposed in one of the divided optical parts in the vicinity of the image forming plane defined by the objective optical system, the photometering sensitivity distribution and the photometering characteristics can be optionally modified and set.

We claim:

1. A zoom finder including at least one movable lens groups, said zoom finder comprising:
    an objective optical system of positive power having a first lens group of negative power, a second lens group of positive power, and means for producing a field flattening effect for correcting a curvature of field, said objective optical system forming a real image of an object;
    an eyepiece optical system of positive power through which the real image formed by said objective optical system is observed; and
    said field flattening means comprising a third lens group, wherein a focal length f3 of said third lens group and a focal length $f_t$ of said objective optical system at a telephoto extremity satisfy the following relationship:
    $|f_T/f3| < 0.5$.

2. A zoom finder according to claim 1, wherein said third lens group comprises a meniscus lens of a weak power.

3. A zoom finder according to claim 1, wherein said second lens group is movable along the optical axis of said objective optical system to vary the power, said first lens group being movable in association with said second lens in order to maintain a constant diopter.

4. A zoom finder according to claim 3, wherein said third lens group is movable along the optical axis of said objective optical system in association with said first and second lens groups.

5. A zoom finder according to claim 1, wherein said third lens group of said objective optical system includes a lens having, on at least one surface thereof, an aspherical surface.

6. A zoom finder according to claim 1, wherein said third lens group of said objective optical system is a stationary lens group.

7. A zoom finder according to claim 1, further comprising a condenser lens which is located near the image formed by said objective optical system.

8. A zoom finder according to claim 1, wherein said third lens group is made of a convex-convex lens.

9. A zoom finder according to claim 1, wherein said third lens group is made of a concave-concave lens.

10. A zoom finder according to claim 1, further comprising an optical path dividing element which is provided in an optical path closer to an object to be taken than a focal point of said objective optical system to split the optical path, and a photometering element which is provided in one of the split optical paths in the vicinity of the focal point of said objective optical system.

11. A zoom finder according to claim 10, wherein said optical path dividing element is a half mirror.

12. A zoom finder according to claim 11, wherein said half mirror is provided on its rear surface with a light-dispersing portion.

13. A zoom finder including an objective optical system of a positive power having a first lens group of negative power, a second lens group of positive power and a third lens group, and an eyepiece optical system of positive power through which an image formed by said objective optical systme is observed, comprising:
    power-varying means for moving said second lens group along the optical axis of said objective optical system to vary the power;
    diopter-adjusting means for moving said first lens group in association with said second lens group in order to maintain a constant diopter; and
    means for producing a field flattening effect with said third lens group for correcting a curvature of field, wherein a focal length f3 of said third lens group and a focal length $f_t$ of said objective optical system satisfy $|f_T/f3| < 0.5$ at a telephoto extremity.

14. A zoom lens finder according to claim 13, wherein said third lens group is movable along the optical axis of said objective optical system in association with said second lens group.

15. A zoom finder according to claim 13, wherein said third lens group comprises a meniscus lens of a weak power.

16. A zoom finder according to claim 13, wherein said third lens group of said objective optical system is a stationary lens group.

17. A zoom finder according to claim 13, wherein said first lens group includes a lens having, on at least one surface thereof, an aspherical surface with a curative that decreases towards the peripheral portion thereof.

18. A zoom finder, including at least one movable lens group, said zoom finder comprising:

an objective optical system of positive power having a first lens group of negative power, a second lens group of positive power, and means for producing a field flattening effect for correcting a curvature of field; and an eyepiece optical system of positive power through which an image formed by said objective optical system is observed said means for producing a field flattening effect comprising a third lens group and wherein a focal length f3 of said third lens group and a focal length $f_T$ of said objective optical system at a telephoto extremity satisfy the following relationship:

$|f_T/f3| < 0.5$.

* * * * *

UNITED STATES PATENT AND TRADEMARK OFFICE
CERTIFICATE OF CORRECTION

PATENT NO. : 5,309,286
DATED : May 3, 1994
INVENTOR(S) : T. ABE et al.

It is certified that error appears in the above-indentified patent and that said Letters Patent is hereby corrected as shown below:

On the cover sheet, at line 10 of the ABSTRACT, change "systems" to ---system---.
At column 13, line 47 (claim 1, line 2), change "groups" to ---group---.
At column 13, line 59 (claim 1, line 14), change "$f_t$" to ---$f_T$---.
At column 14, line 39 (claim 13, line 6), change "systme" to ---system---.

Signed and Sealed this

Eighteenth Day of April, 1995

BRUCE LEHMAN

*Attest:*

*Attesting Officer*

Commissioner of Patents and Trademarks